(12) United States Patent
Hirano

(10) Patent No.: US 8,480,200 B2
(45) Date of Patent: Jul. 9, 2013

(54) IMAGE PROCESSING METHOD, IMAGE PROCESSING APPARATUS, IMAGE FORMING APPARATUS, IMAGE FORMING SYSTEM, AND STORAGE MEDIUM

(75) Inventor: Masanori Hirano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 421 days.

(21) Appl. No.: 12/996,651

(22) PCT Filed: Jun. 30, 2009

(86) PCT No.: PCT/JP2009/062262
§ 371 (c)(1),
(2), (4) Date: Dec. 7, 2010

(87) PCT Pub. No.: WO2010/004946
PCT Pub. Date: Jan. 14, 2010

(65) Prior Publication Data
US 2011/0090276 A1    Apr. 21, 2011

(30) Foreign Application Priority Data

Jul. 9, 2008 (JP) ................................. 2008-179616

(51) Int. Cl.
*B11J 29/38* (2006.01)
(52) U.S. Cl.
USPC .......................................................... 347/14
(58) Field of Classification Search
USPC .......................................................... 347/14
See application file for complete search history.

(56) References Cited

U.S. PATENT DOCUMENTS

| | | | |
|---|---|---|---|
| 6,036,300 | A | 3/2000 | Suzuki et al. |
| 6,702,426 | B2 | 3/2004 | Yashima |
| 6,733,100 | B1 | 5/2004 | Fujita et al. |
| 6,908,176 | B2 | 6/2005 | Koitabashi et al. |
| 6,953,238 | B2 | 10/2005 | Koitabashi et al. |
| 7,102,791 | B2 | 9/2006 | Hirano et al. |

(Continued)

FOREIGN PATENT DOCUMENTS

| | | |
|---|---|---|
| JP | 5 309874 | 11/1993 |
| JP | 2001 63008 | 3/2001 |

(Continued)

OTHER PUBLICATIONS

International Search Report issued Oct. 20, 2009 in PCT/JP09/62262 filed Jun. 30, 2009.

*Primary Examiner* — Uyen Chau N Le
*Assistant Examiner* — Hoang Tran
(74) *Attorney, Agent, or Firm* — Oblon, Spivak, McClelland, Maier & Neustadt, L.L.P.

(57) ABSTRACT

An image processing method includes converting multilevel data of an image into a dot pattern using a multilevel error diffusion process. The conversion includes determining a pixel corresponding to an abnormal nozzle based on abnormal nozzle information provided for each of droplet sizes supported by nozzles of an image forming apparatus; preventing jetting of a droplet onto the determined pixel; distributing a quantization error of the determined pixel calculated in the multilevel error diffusion process to neighboring pixels; and if extra-large droplets with a droplet size greater than the droplet size of a full-size droplet capable of filling a pixel are to be formed in the neighboring pixels as a result of distributing the quantization error, removing one or more of the extra-large droplets or reducing the droplet size of one or more of the extra-large droplets.

7 Claims, 29 Drawing Sheets

U.S. PATENT DOCUMENTS

| | | |
|---|---|---|
| 7,210,757 B2 * | 5/2007 | Hirano ............................. 347/15 |
| 7,327,503 B2 | 2/2008 | Yashima et al. |
| 7,710,620 B2 | 5/2010 | Sakakibara et al. |
| 2004/0218221 A1 | 11/2004 | Hirano et al. |
| 2005/0174384 A1 * | 8/2005 | Koitabashi et al. ............. 347/43 |
| 2005/0200900 A1 | 9/2005 | Hirano |
| 2005/0231742 A1 | 10/2005 | Hirano |
| 2006/0044615 A1 | 3/2006 | Kobashi et al. |
| 2006/0082848 A1 | 4/2006 | Takakura et al. |

FOREIGN PATENT DOCUMENTS

| | | |
|---|---|---|
| JP | 2002 19101 | 1/2002 |
| JP | 2003 136702 | 5/2003 |
| JP | 2003 136763 | 5/2003 |
| JP | 2003 136764 | 5/2003 |
| JP | 2003 205604 | 7/2003 |
| JP | 2006 62088 | 3/2006 |
| JP | 2006 115431 | 4/2006 |
| JP | 2006 173929 | 6/2006 |

* cited by examiner

RECORDING HEAD

RECORDING HEAD

RECORDING HEAD

RECORDING HEAD

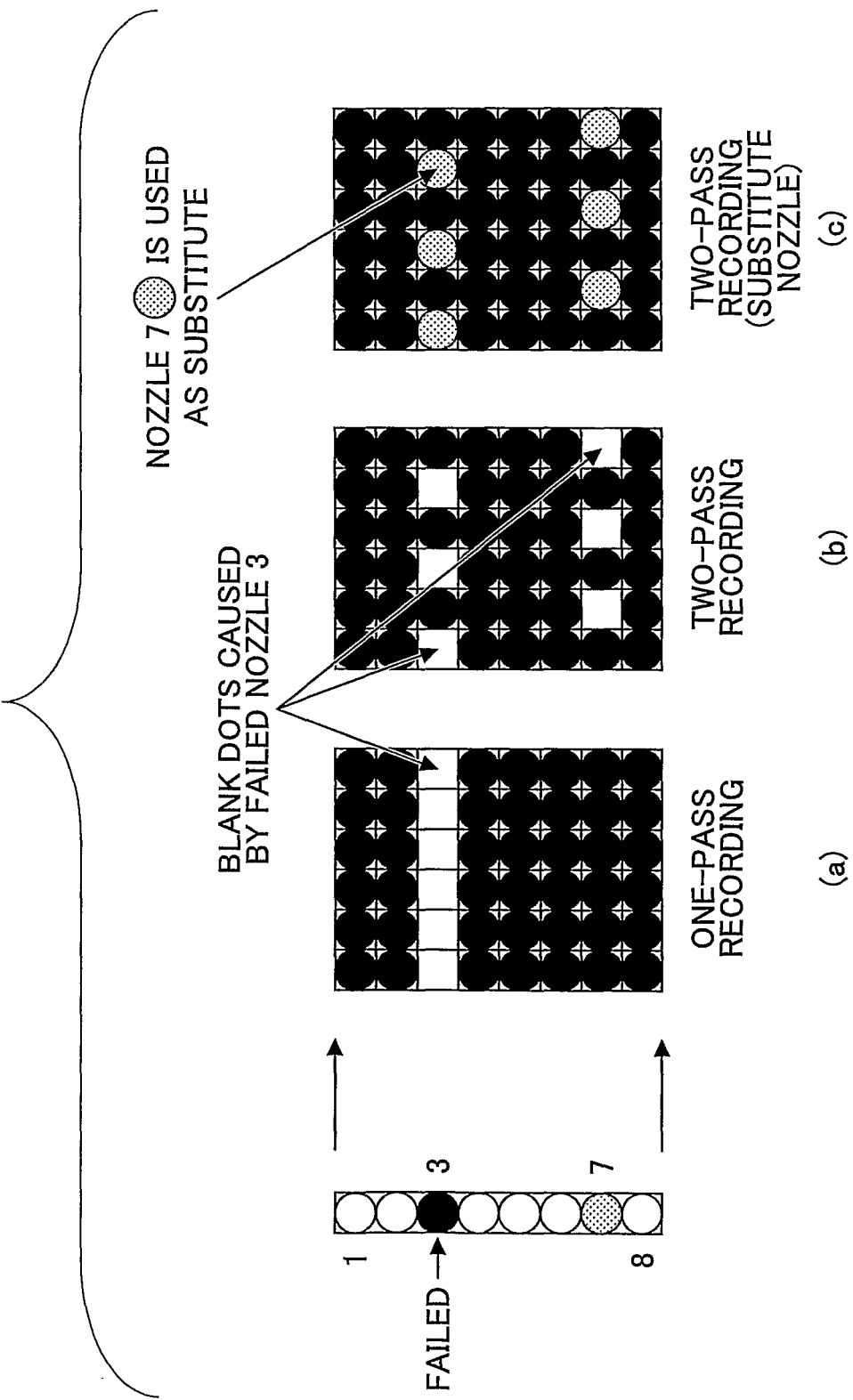

ABNORMAL NOZZLE DETECTION PATTERN

ABNORMAL NOZZLE DETECTION PATTERN

IMAGE PROCESSING METHOD, IMAGE PROCESSING APPARATUS, IMAGE FORMING APPARATUS, IMAGE FORMING SYSTEM, AND STORAGE MEDIUM

TECHNICAL FIELD

A certain aspect of the present invention relates to an image processing method, an image processing apparatus, an image forming apparatus, an image forming system, and a storage medium.

BACKGROUND ART

A liquid-jet image forming apparatus such as an inkjet recording apparatus uses one or more recording heads for jetting ink droplets to form an image. A liquid-jet image forming apparatus is used, for example, for a printer, a facsimile machine, a copier, a plotter, or a multifunction copier having functions of them. Such a liquid-jet image forming apparatus jets ink droplets from its recording heads onto paper and thereby forms (records or prints) an image on the paper. There are roughly two types of liquid-jet image forming apparatuses: a serial-type image forming apparatus including a recording head that jets ink droplets while moving in the main-scanning direction to form an image; and a line-type image forming apparatus including a line-type recording head that does not move when jetting ink droplets to form an image.

In the present application, a liquid-jet image forming apparatus refers to an apparatus that forms an image by jetting ink droplets onto a recording medium made of paper, thread, fabric, textile, leather, metal, plastic, glass, wood, ceramic, etc. Also, "image forming" indicates not only a process of forming a meaningful image such as a character or a drawing on a recording medium, but also a process of forming a meaningless image such as a pattern on a recording medium (or a process of just jetting ink droplets onto a recording medium). "Ink" refers not only to an ink (colored liquid) in a general sense, but also to any liquid usable for image forming such as a recording liquid or a fixing liquid. Further, "paper" refers not only to a recording medium (recording paper) made of paper, but also to any recording medium such as an OHP sheet or a fabric to which ink droplets can adhere.

Such liquid-jet image forming apparatuses (hereafter, simply called "inkjet recording apparatuses") are being continuously upgraded to improve the quality of color images formed with multiple color inks, to increase the drive frequency of a liquid-jet head, and to increase the number of nozzles on each recording head to improve the recording speed.

Meanwhile, an inkjet head used as a liquid-jet head sometimes develops a problem called "ink-jetting failure" where a nozzle of the inkjet head becomes unable to jet ink droplets (such a nozzle is called a "failed nozzle"). The ink-jetting failure occurs, for example, because of dust entered into a nozzle during manufacturing, degradation of a nozzle due to long-term use, or degradation of a device for causing ink ejection. Particularly, ink-jetting failure due to degradation of a device for causing ink ejection may randomly occur during the service life of an inkjet recording apparatus.

Also, there is a case where a nozzle is not completely dysfunctional, but the direction of an ink droplet jetted from the nozzle deviates greatly from a desired direction (hereafter called an "inkjet skew") or the size (amount of ink) of an ink droplet jetted from the nozzle greatly differs from a desired size (hereafter called "variation in droplet size"). A nozzle degraded to such an extent as to greatly reduce the quality of an image cannot be used for image recording and is therefore substantially identical with a "failed nozzle".

FIG. 31(a) shows a pattern recorded correctly, FIG. 31(b) shows an example of complete ink-jetting failure, FIG. 31(c) shows an example of an inkjet skew, and FIG. 31(d) shows an example of variation in droplet size. In the present application, nozzles unable to correctly record images due to various causes are collectively called "abnormal nozzles".

Abnormal nozzles have been considered as a minor problem because instances of abnormal nozzles can be reduced by improving the manufacturing environment. However, in current inkjet recording apparatuses where the number of nozzles on each recording head has been increased as described above to improve the recording speed, the problem of abnormal nozzles are not negligible. For example, manufacturing high-quality recording heads including no abnormal nozzle or designed to prevent occurrence of abnormal nozzles require higher production costs which lead to higher prices of the recording heads.

Abnormal nozzles may cause defects such as a white stripe in an image.

Patent documents 1 and 2 disclose a correction method employing multiscan recording to fill a white stripe caused by an abnormal nozzle. In multiscan recording, an image is recorded by scanning a corresponding area of a recording medium multiple times with a recording head. Therefore, the white stripe can be filled by using a normal nozzle during multiple scanning passes.

[Patent document 1] Japanese Patent Application Publication No. 5-309874

[Patent document 2] Japanese Patent Application Publication No. 2001-63008

However, to improve the recording speed of an inkjet recording apparatus, it is preferable to employ "one-pass recording" where an image is formed by scanning a recording medium only once. Accordingly, with one-pass recording, it is not possible to fill or cover (make inconspicuous, obscure, or conceal) a blank in an image caused by ink-jetting failure using a normal nozzle as in multiscan recording.

Also, even with multiscan recording, there are cases where it is difficult to fill a blank caused by abnormal nozzles due to the positions and/or number of the abnormal nozzles. For example, in a multiscan recording mode where the number of passes is comparatively small, nozzles usable as substitutes for abnormal nozzles are limited and the workload of the substitute nozzles increases. Also, in some cases, substitute nozzles may not be available due to characteristics of the recording head or drive waveform design.

Patent documents 3 through 7 propose a different correction method where a blank caused by an abnormal nozzle in highlights (low density area) of an image data is covered by increasing the density of pixels near the blank, and a blank in a dark area of an image data with saturation density is covered using dots having a different color but a similar brightness.

[Patent document 3] Japanese Patent Application Publication No. 2002-19101

[Patent document 4] Japanese Patent Application Publication No. 2003-136702

[Patent document 5] Japanese Patent Application Publication No. 2003-136763

[Patent document 6] Japanese Patent Application Publication No. 2003-136764

[Patent document 7] Japanese Patent Application Publication No. 2003-205604

However, even the correction method disclosed by patent documents 3 through 7 is not applicable to all situations. For example, image data that can be increased in density are not always available near unfilled pixels corresponding to an abnormal nozzle. Also, increasing the density of only pixels in the very vicinity of the unfilled pixels may increase the granularity.

Meanwhile, there are inkjet recording apparatuses employing a multi-dot technology that enables varying the droplet size. In such inkjet recording apparatuses, it may happen that ink droplets of a certain size cannot be jetted but ink droplets of other sizes can be normally jetted. The method disclosed in patent documents 3 through 7 is based on the binary representation of pixels and is therefore not applicable to the multi-dot technology where the droplet size is variable. It is of course possible to treat nozzles incapable of jetting ink droplets of one or more sizes as abnormal nozzles. However, in this case, correction is applied even to pixels to be formed with ink droplets of sizes that the abnormal nozzles can jet correctly. This in turn may reduce the quality of an image.

Patent documents 8 and 9 propose still another correction method that employs a multilevel error diffusion process supporting the multi-dot technology. In the proposed method, droplet sizes of pixels around pixels corresponding to an abnormal nozzle are changed to cover a defect caused by the abnormal nozzle or to compensate for droplets with incorrect sizes jetted by the abnormal nozzle.

[Patent document 8] Japanese Patent Application Publication No. 2006-115431

[Patent document 9] Japanese Patent Application Publication No. 2006-173929

The disclosed method using the multilevel error diffusion process makes it possible to form dots to cover a white stripe caused by an abnormal nozzle while achieving a natural balance with surrounding normal pixels by appropriately controlling sizes and arrangements of droplets.

Meanwhile, in inkjet recording, the quality of a recorded matter varies greatly depending on physical properties of ink and a recording medium used. Although the above method makes it possible to achieve a natural arrangement of ink droplets on a recording medium using the multilevel error diffusion process, i.e., to optimize the two-dimensional arrangement of ink droplets, the influence of increasing the droplet sizes such as the influence on the penetration of ink into the recording medium is not considered in the method.

Normally, the maximum droplet size is determined such that a surface area of a recording medium can be completely covered using droplets with the maximum droplet size (i.e., a droplet size that can fill a pixel (the area assigned to each pixel) or form a "fill pattern" as shown in FIG. 25($a$)). The maximum droplet size may be set at a value greater than a droplet size necessary to fill a pixel. However, since the degree of penetration of an ink into a recording medium varies depending on the absorption characteristics of the ink and the recording medium, using droplets with such a large droplet size (or a large amount of ink) may in some cases cause bleeding and reduce the quality of an edge portion (or at a color boundary) of an image and may also affect color development.

Such problems caused by excessive amount of ink are side effects (secondary problems) caused by a correction process performed to cover a white stripe. Thus, the above related-art method employing the multilevel error diffusion process may cause such side effects.

SUMMARY OF THE INVENTION

Aspects of the present invention provide an image processing method, an image processing apparatus, an image forming apparatus, an image forming system, and a storage medium that solve or reduce one or more problems caused by the limitations and disadvantages of the related art.

An aspect of the present invention provides a method of processing image data for an image forming apparatus for forming an image on a recording medium using a recording head including multiple nozzles for jetting ink droplets. The method includes a conversion step of converting multilevel data of the image into a dot pattern using a multilevel error diffusion process supporting n gradation levels (n≧2). The conversion step includes the steps of determining a pixel corresponding to an abnormal nozzle incapable of correctly jetting droplets onto the recording medium or incapable of jetting droplets of a particular droplet size based on abnormal nozzle information provided for each of droplet sizes supported by the nozzles; preventing jetting of a droplet onto the determined pixel corresponding to the abnormal nozzle; distributing a quantization error of the determined pixel calculated in the multilevel error diffusion process to neighboring pixels; and if extra-large droplets with a droplet size greater than the droplet size of a full-size droplet capable of filling a pixel are to be formed in the neighboring pixels as a result of distributing the quantization error, removing one or more of the extra-large droplets or reducing the droplet size of one or more of the extra-large droplets.

Another aspect provides an image processing apparatus for processing image data for an image forming apparatus for forming an image on a recording medium using a recording head including multiple nozzles for jetting ink droplets. The apparatus includes a control unit configured to convert multilevel data of the image into a dot pattern using a multilevel error diffusion process supporting n gradation levels (n≧2). The control unit is configured to determine a pixel corresponding to an abnormal nozzle incapable of correctly jetting droplets onto the recording medium or incapable of jetting droplets of a particular droplet size based on abnormal nozzle information provided for each of droplet sizes supported by the nozzles; to prevent jetting of a droplet onto the determined pixel corresponding to the abnormal nozzle; to distribute a quantization error of the determined pixel calculated in the multilevel error diffusion process to neighboring pixels; and if extra-large droplets with a droplet size greater than a droplet size of a full-size droplet capable of filling a pixel are to be formed in the neighboring pixels as a result of distributing the quantization error, to remove one or more of the extra-large droplets or reduce the droplet size of one or more of the extra-large droplets.

Another aspect provides an image forming system including an image forming apparatus configured to form an image on a recording medium using a recording head including multiple nozzles for jetting ink droplets. The image forming apparatus includes a control unit configured to convert multilevel data of the image into a dot pattern using a multilevel error diffusion process supporting n gradation levels (n≧2). The control unit is configured to determine a pixel corresponding to an abnormal nozzle incapable of correctly jetting droplets onto the recording medium or incapable of jetting droplets of a particular droplet size based on abnormal nozzle information provided for each of droplet sizes supported by the nozzles; to prevent jetting of a droplet onto the determined pixel corresponding to the abnormal nozzle; to distribute a quantization error of the determined pixel calculated in the multilevel error diffusion process to neighboring pixels; and if extra-large droplets with a droplet size greater than a droplet size of a full-size droplet capable of filling a pixel are to be formed in the neighboring pixels as a result of distributing the quantization error, to remove one or more of the extra-large droplets or reduce the droplet size of one or more of the extra-large droplets.

BRIEF DESCRIPTION OF DRAWINGS

FIG. 17 is a drawing illustrating blank dots caused by abnormal nozzles and a method of filling the blank dots with a substitute nozzle;

DESCRIPTION OF EMBODIMENTS

Figure 1:
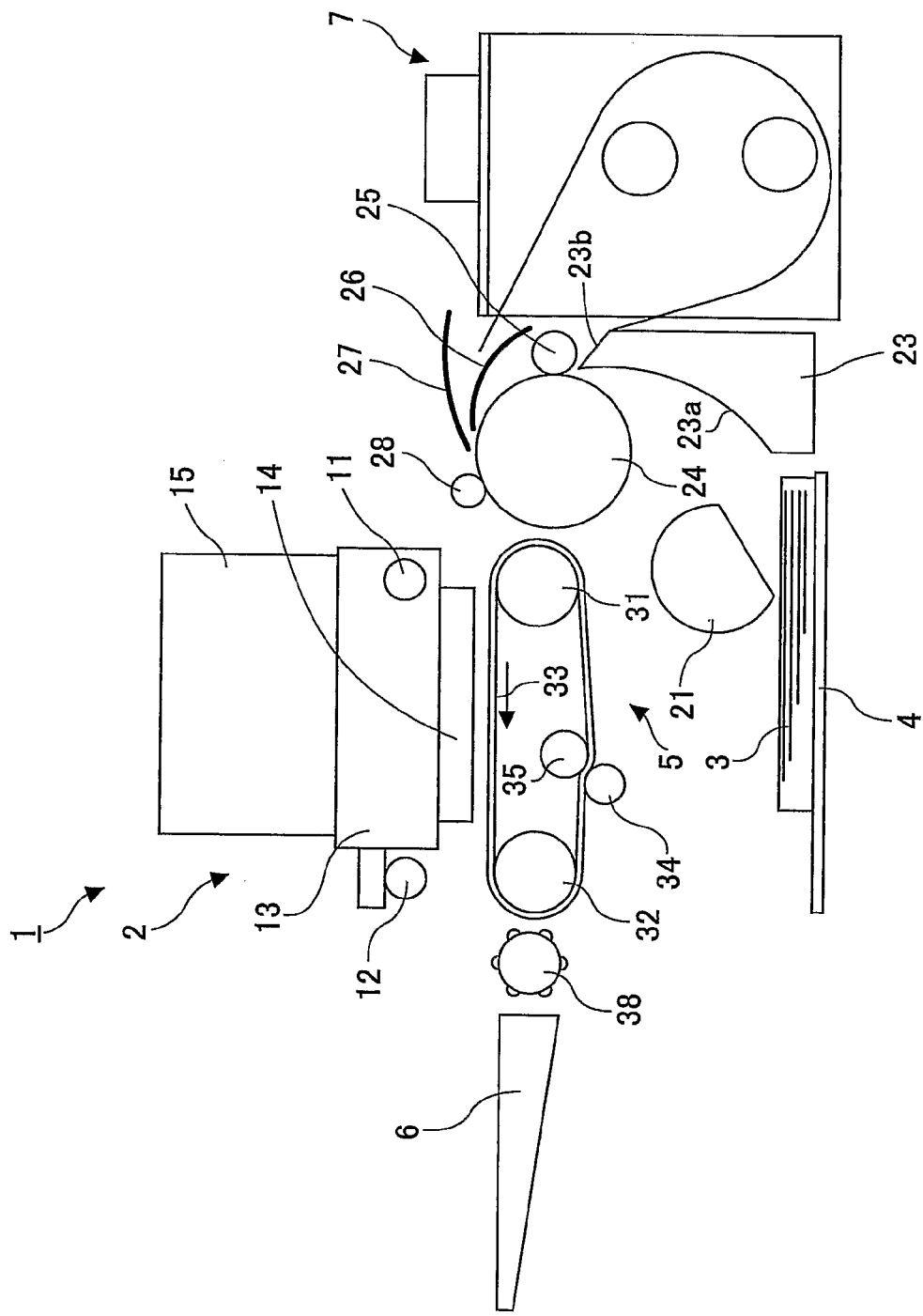
FIG. 1 is a schematic diagram illustrating mechanical parts of an inkjet recording apparatus provided as an example of an image forming apparatus according to an embodiment of the present invention.
Figure 2:
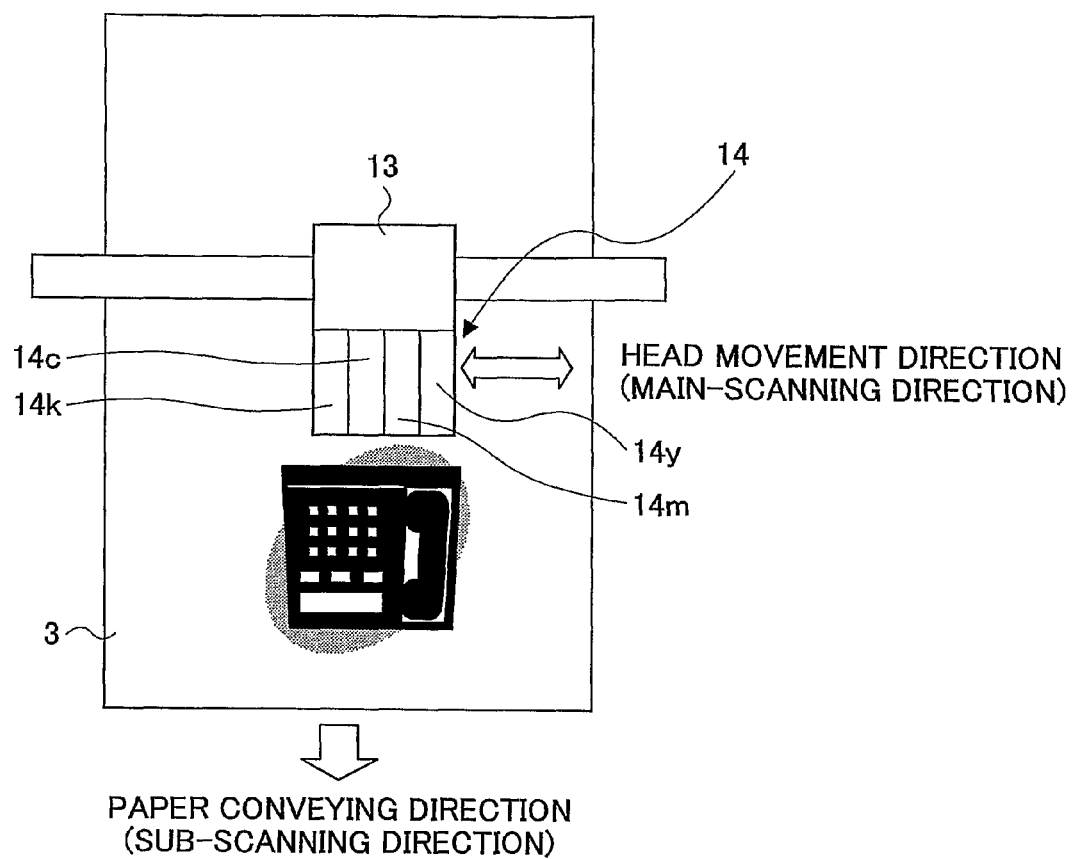
FIG. 2 is a plan view of the mechanical parts shown in FIG. 1.
Figure 3:
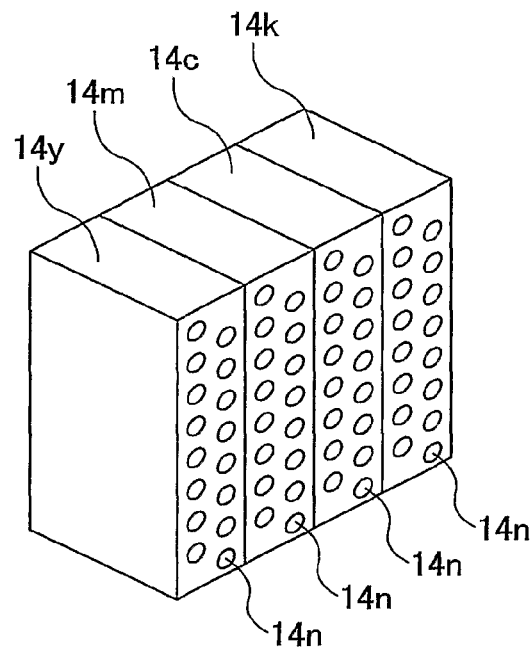
FIG. 3 is a perspective view of a head unit of the inkjet recording apparatus.
Figure 4:
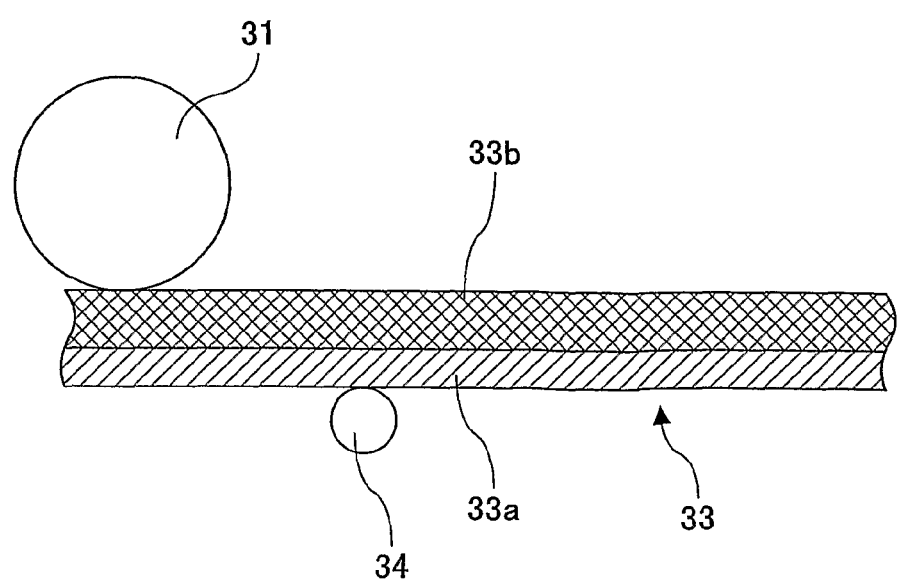
FIG. 4 is a schematic diagram illustrating an exemplary conveyor belt of the inkjet recording apparatus.

Preferred embodiments of the present invention are described below with reference to the accompanying drawings. An inkjet recording apparatus used as an example of an image forming apparatus according to an embodiment of the present invention is described below with reference to FIGS. 1 through 4. FIG. 1 is a schematic diagram of mechanical parts of the inkjet recording apparatus; FIG. 2 is a plan view of the mechanical parts; FIG. 3 is a perspective view of a head unit of the inkjet recording apparatus; and FIG. 4 is a schematic diagram of a conveyor belt of the inkjet recording apparatus.

The inkjet recording apparatus includes a main unit 1 including an image forming unit 2, and a paper-feed tray 4 disposed below the main unit 1 and capable of holding multiple recording media 3 (hereafter called paper 3). The paper 3 is fed from the paper-feed tray 4 into a conveying mechanism 5. The image forming unit 2 forms an image on the paper 3 being conveyed by the conveying mechanism 5. After the image is formed, the paper 3 is ejected onto a paper-catch tray 6 attached to a side of the main unit 1.

The inkjet recording apparatus also includes a duplex unit 7 detachably attached to the main unit 1. When images are to be formed on both sides of the paper 3, the paper 3 is conveyed in the reverse direction by the conveying mechanism 5 into the duplex unit 7 after an image is formed on one side (front side) of the paper 3. The duplex unit 7 turns the paper 3 upside down so that the other side (back side) of the paper 3 faces upward and feeds the paper 3 again into the conveying mechanism 5. After an image is formed on the back side, the paper 3 is ejected onto the paper-catch tray 6.

The image forming unit 2 includes a carriage 13 slidably attached to guide shafts 11 and 12. The carriage 13 is moved by a main-scanning motor (not shown) in a direction (main-scanning direction) orthogonal to the conveying direction of the paper 3. The carriage 13 includes recording heads 14 that are liquid-jet heads each having an array of nozzle holes 14*n* (see FIG. 3) for jetting liquid droplets. Ink cartridges 15 are detachably attached to the recording heads 14 to supply inks to the recording heads 14. Alternatively, sub-tanks may be attached to the recording heads 14 instead of the ink cartridges 15. In this case, inks are supplied to the sub-tanks from main tanks.

In this embodiment, it is assumed that recording heads 14*y*, 14*m*, 14*c*, and 14*k* are provided, respectively, for yellow (Y), magenta (M), cyan (C), and black (Bk) inks and configured to jet ink droplets of the corresponding colors. Alternatively, one or more recording heads having arrays of nozzles for jetting ink droplets of the respective colors may be used. The number and order of colors are not limited to those mentioned above.

Each of the recording heads 14, for example, includes an energy-generating unit (pressure generator) for generating energy to jet ink droplets. Examples of the energy-generating unit include a piezoelectric actuator such as a piezoelectric element, a thermal actuator employing phase change of liquid resulting from film boiling caused by an electrothermal converting element such as a heat element, a shape memory alloy actuator employing metal phase change caused by a temperature change, or an electrostatic actuator employing static electricity.

Sheets of the paper 3 in the paper-feed tray 4 are separated one by one by a paper-feed roller (crescent roller) 21 and a separating pad (not shown) and fed into the conveying mechanism 5 of the main unit 1.

The conveying mechanism 5 includes a conveying guide 23 for guiding the paper 3 fed from the paper-feed tray 4 in an upward direction along a guide surface 23a and guiding the paper 3 fed from the duplex unit 7 along a guide surface 23b; a conveying roller 24 for conveying the paper 3; a pressing roller 25 for pressing the paper 3 against the conveying roller 24; a guide part 26 for guiding the paper 3 to the conveying roller 24; a guide part 27 for guiding the paper 3 returned during duplex printing to the duplex unit 7; and a pressing roller 28 for holding down the paper 3 fed from the conveying roller 24.

The conveying mechanism 5 also includes a conveyor belt 33 that is stretched between a drive roller 31 and a driven roller 32 and configured to convey the paper 3 on a flat surface under the recording heads 14; a charging roller 34 for charging the conveyor belt 33; a guide roller 35 facing the charging roller 34; a guide part (platen) (not shown) for guiding the conveyor belt 33 at a position facing the image forming unit 2; and a cleaning roller (cleaning unit) (not shown) made of, for example, a porous body for removing a recording liquid (ink) adhering to the conveyor belt 33.

The conveyor belt 33 is an endless belt and is stretched between the drive roller 31 and the driven roller (tension roller) 32. The conveyor belt 33 rotates in the direction of the arrow (paper conveying direction) shown in FIG. 1.

The conveyor belt 33 may be composed of a single layer, two layers (a first layer (front layer) 33a and a second layer (back layer) 33b) as shown in FIG. 4, or three or more layers. For example, the conveyor belt 33 may include a front layer (paper-attracting surface) that attracts the paper 3 and a back layer (medium-resistance layer or earth layer). The front layer may be made of a pure resin material, such as an ethylene-tetrafluoroethylene (ETFE) pure material, that is not resistance-adjusted and has a thickness of about 40 μm. The back layer may be made of a material prepared by adjusting, with carbon, the resistance of the same material as that used for the front layer.

The charging roller 34 is in contact with the front layer of the conveyor belt 33 and is configured to rotate according to the rotation of the conveyor belt 33. A high voltage is applied in a predetermined pattern from a high-voltage circuit (high-voltage power supply or bias voltage supply) (not shown) to the charging roller 34.

The inkjet recording apparatus further includes a paper-eject roller 38 disposed downstream of the conveying mechanism 5. The paper-eject roller 38 ejects the paper 3 onto the paper-catch tray 6 after an image is formed on the paper 3.

In the inkjet recording apparatus configured as described above, the conveyor belt 33 is rotated in the direction indicated by the arrow and is charged by the contacting charging roller 34 to which a high voltage (AC bias voltage) is being applied. The polarity of the voltage applied to the charging roller 34 is switched at predetermined intervals and therefore the conveyor belt 33 is charged with alternate polarity at predetermined charging pitch.

When the paper 3 is placed on the charged conveyor belt 33, the paper 3 is internally polarized and electric charges having opposite polarity to that of electric charges on the conveyor belt 33 are attracted to a side of the paper 3 contacting the conveyor belt 33. As a result, the electric charges on the conveyor belt 33 and the electric charges on the paper 3 are electrostatically attracted to each other and the paper 3 is attracted to the conveyor belt 33. Thus, the paper 3 is strongly attracted to the conveyor belt 33 and as a result, warpage and bumps of the paper 3 are corrected and the paper 3 is substantially flattened.

Figure 5:
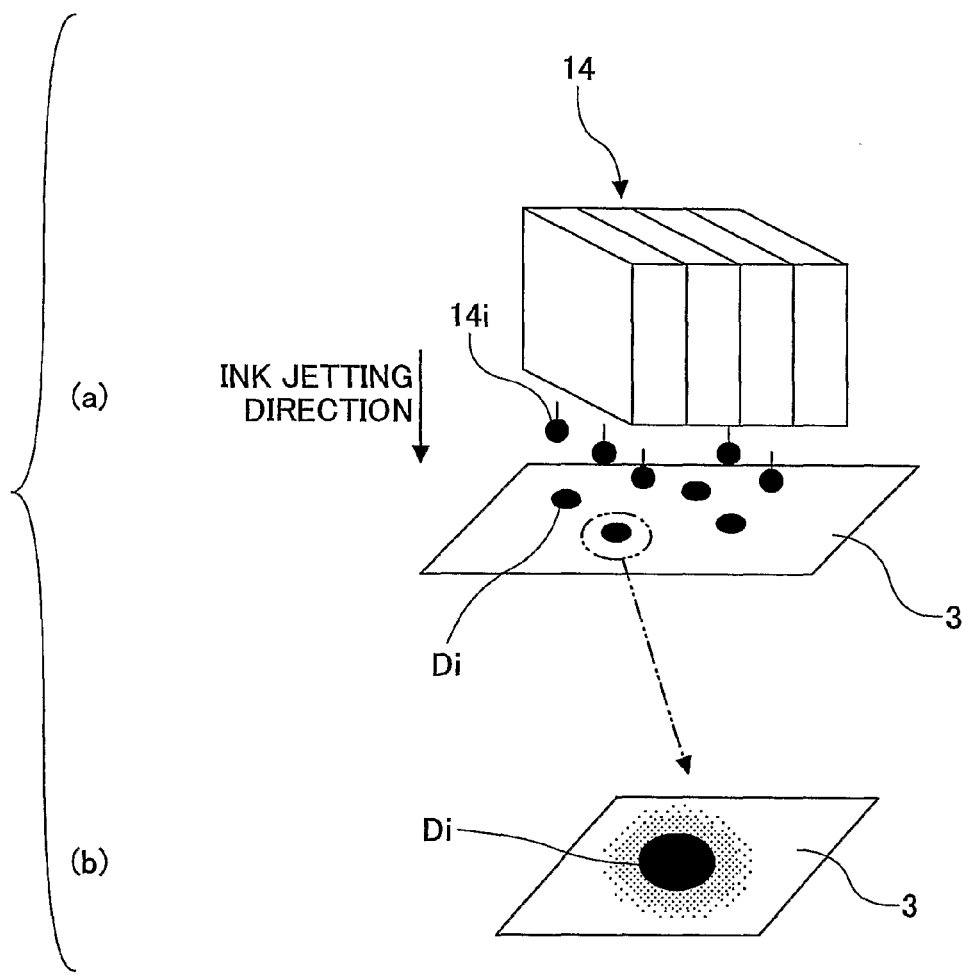
FIG. 5 is a drawing used to describe an exemplary image forming process performed by the inkjet recording apparatus.

The conveyor belt 33 is rotated to move the paper 3 and the recording heads 14 are driven according to an image signal while moving the carriage 13 in one or both directions. Liquid droplets (or ink droplets) 14i are jet from the recording heads 14 onto the paper 3 that is temporarily stopped to form dots Di and thereby to record one line of an image. Then, the paper 3 is moved a predetermined distance to record the next line. When a recording end signal or a signal indicating that the rear edge of the paper 3 has reached the recording area is received, the recording process is terminated. FIG. 5(b) is an enlarged image of a dot Di in FIG. 5(a).

The paper 3 with the recorded image is ejected by the paper-eject roller 38 onto the paper-catch tray 6.

In this embodiment, it is assumed that the head unit of the inkjet recording apparatus includes four color recording heads. However, the number and order of recording heads are not limited to those described above. For example, the head unit of the inkjet recording apparatus may include six color recording heads as shown in FIGS. 6 and 7 or seven color recording heads as shown in FIGS. 8 and 9

Figure 6:
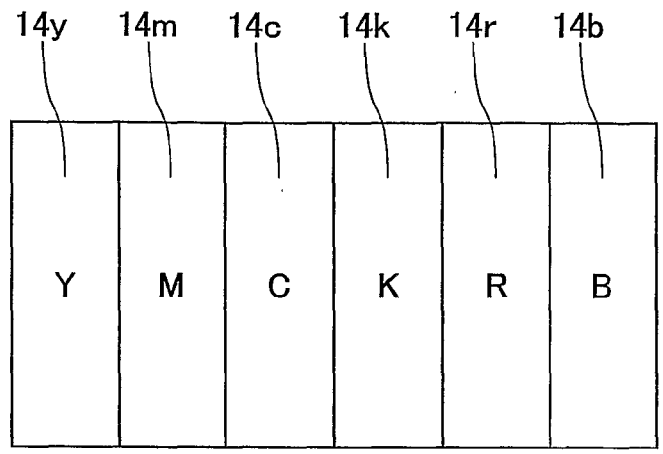
FIG. 6 is a drawing illustrating a first example of a head unit including heads for CMYK inks and several spot color inks.

FIG. 6 shows an exemplary head unit including recording heads 14r and 14b for red (R) and blue (B) in addition to recording heads 14y, 14m, 14c, and 14k for yellow (Y), magenta (M), cyan (C), and black (Bk) (separate recording heads or separate arrays of nozzles on one or more recording heads for the respective colors).

Figure 7:
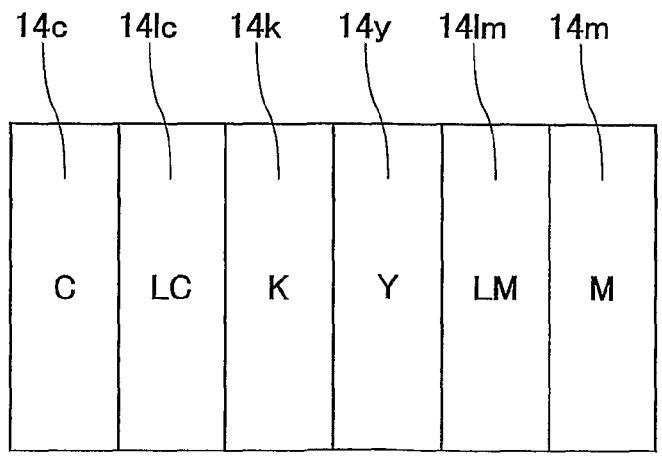
FIG. 7 is a drawing illustrating a second example of a head unit.

FIG. 7 shows an exemplary head unit including recording heads 141c and 141m for light cyan (LC) and light magenta (LM) with reduced density in addition to recording heads 14y, 14m, 14c, and 14k for yellow (Y), magenta (M), cyan (C), and black (Bk).

Figure 8:
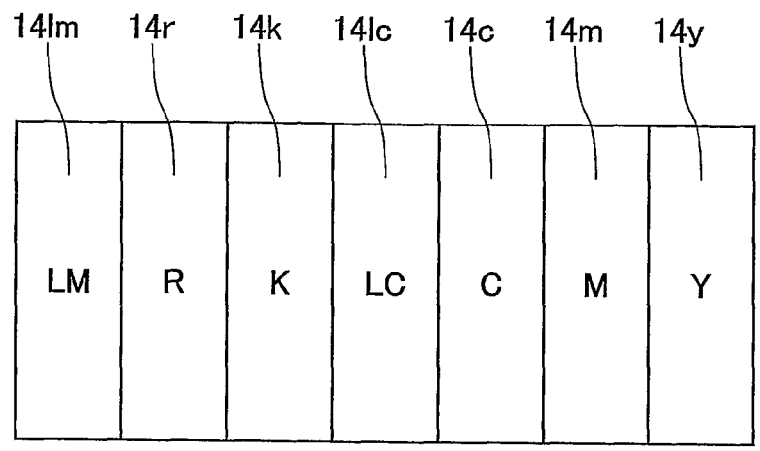
FIG. 8 is a drawing illustrating a third example of a head unit.
Figure 9:
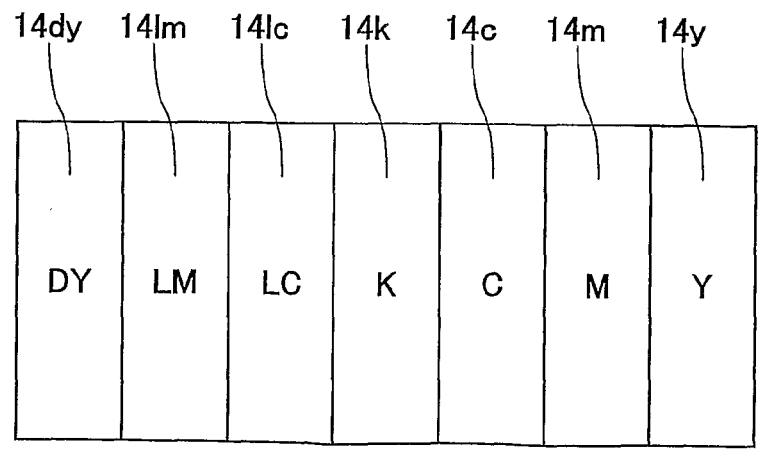
FIG. 9 is a drawing illustrating a fourth example of a head unit.

FIG. 8 shows an exemplary head unit including a recording head 14r for red (R) in addition to six color recording heads shown in FIG. 7. FIG. 9 shows an exemplary head unit including a recording head 14dy for dark yellow (DY) with high color saturation in addition to six color recording heads shown in FIG. 7.

Figure 10:
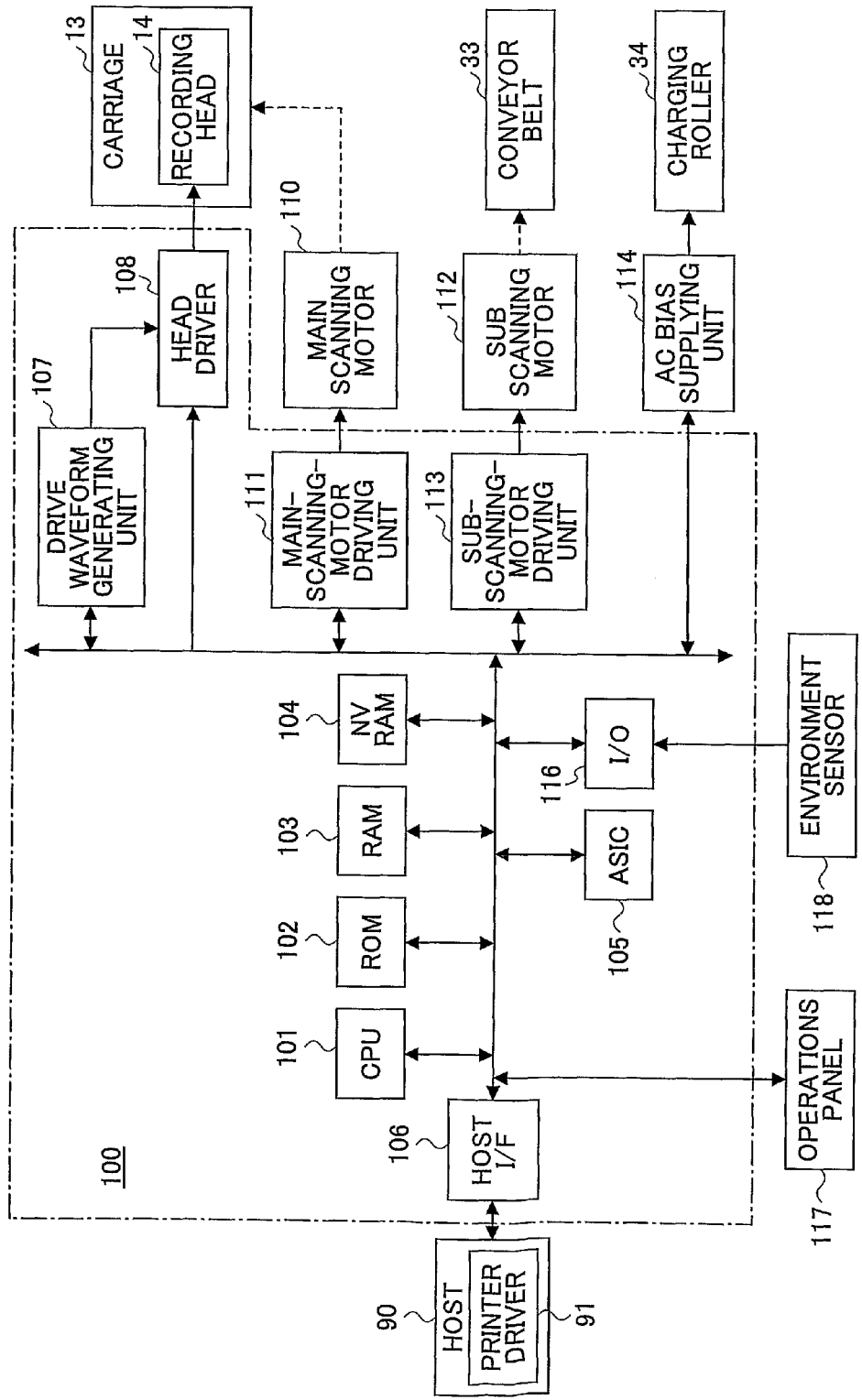
FIG. 10 is a block diagram illustrating an exemplary control unit of the inkjet recording apparatus.

A control unit 100 of the inkjet recording apparatus is described below with reference to a block diagram shown in FIG. 10.

The control unit 100 includes a CPU 101 for controlling the entire inkjet recording apparatus; a ROM 102 for storing programs to be executed by the CPU 101 and other fixed data; a RAM 103 for temporarily storing image data; a non-volatile memory (NVRAM) 104 that retains data even when the power is off; and an ASIC 105 that performs, for example, signal processing and sort operations on image data and processes input/output signals for controlling the inkjet recording apparatus.

The control unit 100 also includes an I/F 106 for sending and receiving data and signals to and from a host 90, which is, for example, a personal computer implementing an image processing apparatus according to an embodiment of the present invention; a drive waveform generating unit 107 and a head driver 108 for controlling the recording heads 14; a main-scanning-motor driving unit 111 for driving a main scanning motor 110; a sub-scanning-motor driving unit 113 for driving a sub scanning motor 112; an AC bias supplying unit 114 for supplying an AC bias to the charging roller 34; and an I/O 116 for receiving detection signals from an environment sensor 118 for detecting an environmental temperature and/or environmental humidity and other sensors (not shown). An operations panel 117 for inputting and displaying information is connected to the control unit 100.

The I/F 106 of the control unit 100, for example, receives print data including image data via a cable or a network from the host 90. The host 90 may be an image (data) processing apparatus such as a personal computer, an image reading apparatus such as an image scanner, or an imaging apparatus such as a digital camera. The host 90 includes a printer driver 91 for generating print data and outputting the generated print data to the control unit 100.

The CPU 101 reads and analyzes print data in a receive buffer of the I/F 106, causes the ASIC 105 to perform operations including a sort operation on the print data, and transfers the print data (image data) to the drive waveform generating unit 107. In this embodiment, print data are converted into bitmap data for printing by the printer driver 91 of the host 90 before the print data are sent to the inkjet recording apparatus. Alternatively, print data may be converted into bitmap data at the inkjet recording apparatus using font data provided, for example, in the ROM 102.

The drive waveform generating unit 107 includes a D/A converter for converting drive pulse pattern data from digital to analog. The drive waveform generating unit 107 outputs a drive waveform composed of one or more drive pulses (drive signals) to the head driver 108.

The head driver 108 selectively applies the drive pulses constituting the drive waveform supplied from the drive waveform generating unit 107 to the pressure generators of the recording heads 14 according to one line of image data (dot pattern data) that are input serially, and thereby drives the recording heads 14. The head driver 108, for example, includes a shift register for storing a clock signal and serial data (image data), a latch circuit for latching a register value of the shift register according to a latch signal, a level conversion circuit (level shifter) for changing the level of an output value from the latch circuit, and an analog switch array (switching unit) that is turned on and off by the level shifter. The head driver 108 selectively applies drive pulses in a drive waveform from the drive waveform generating unit 107 to the pressure generators of the recording heads 14 by turning on and off the analog switch array and thereby drives the recording heads 14. In this embodiment, one or more drive pulses constituting a drive waveform are applied to each of the recording heads 14 to reproduce four gradation levels: a large-size droplet, a medium-size droplet, a small-size droplet, and no droplet.

Figure 11:
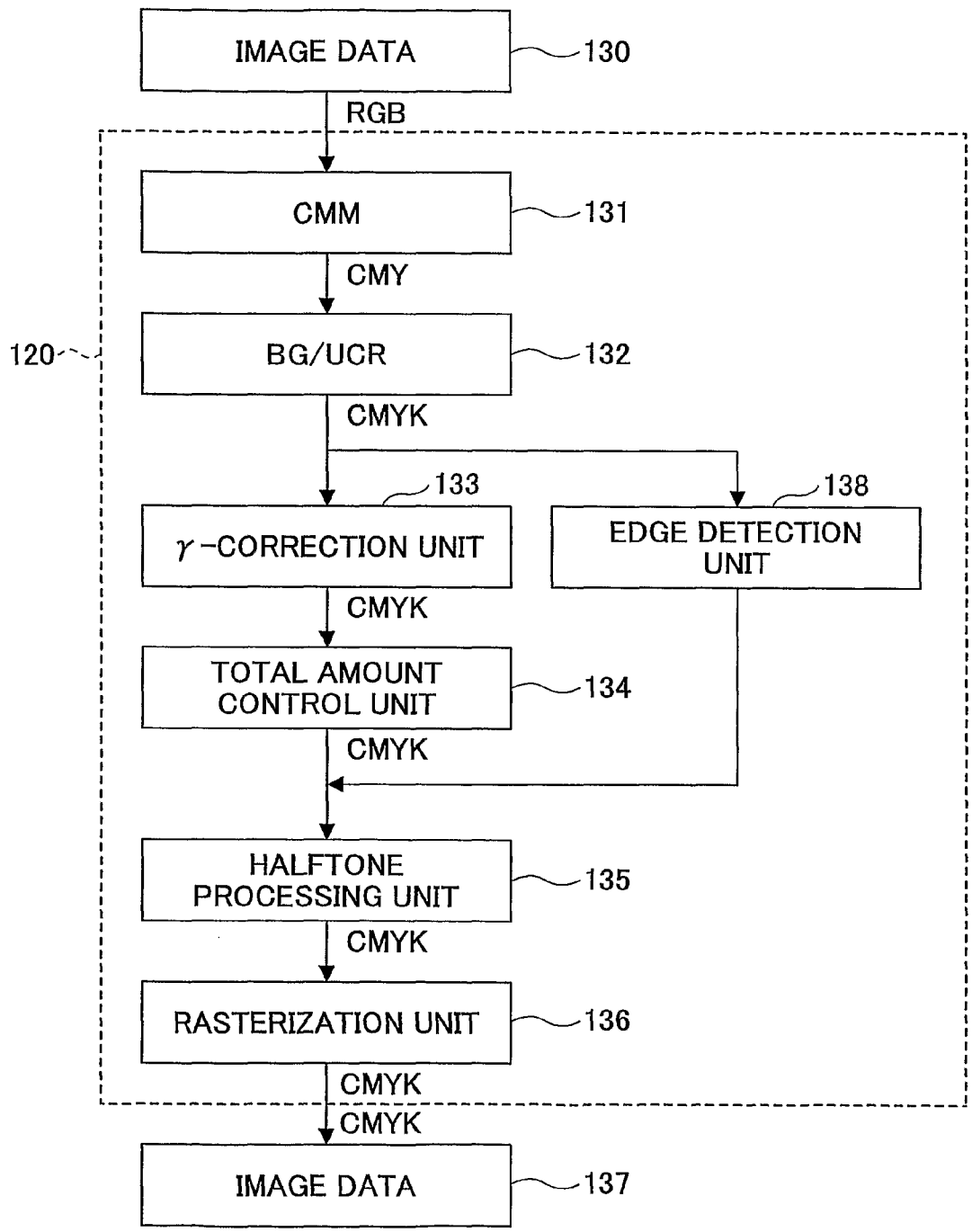
FIG. 11 is a functional block diagram illustrating an exemplary configuration of a printer driver of an image processing apparatus according to an embodiment of the present invention.

An exemplary image processing apparatus (data processing apparatus) used as the host 90 and including a program (the printer driver 91) according to an embodiment of the present invention is described below with reference to FIG. 11. The host 90 sends image data (print data) to the inkjet recording apparatus and thereby causes the inkjet recording apparatus to form an image.

The printer driver 91 of the host 90 includes a color management module (CMM) 131 that converts the color space for monitor display of image data 130, which are supplied, for example, from an application program, to a color space for the inkjet recording apparatus (from an RGB color system to a CMY color system); a black-generation/under-color-removal (BG/UCR) unit 132 for performing a black-generation/under-color-removal process on CMY values; a γ-correction unit 133 that corrects input/output data according to characteristics of the inkjet recording apparatus and user preference; a total amount control unit 134 for performing a total amount control; a halftone processing unit 135 that performs dithering or an error diffusion process to convert image data to dot pattern data to be formed by the inkjet recording apparatus; and a rasterization unit 136 that divides the dot pattern data into portions each corresponding to one scan and assigns dots in each portion of the dot pattern data to nozzles of recording heads. The rasterization unit 136 outputs image data 137 to be sent to the inkjet recording apparatus. The printer driver 91 is, for example, executed by a control unit (not shown) of the host 90 (image processing apparatus). In other words, the control unit of the host 90 is configured to perform a correction process of this embodiment.

The printer driver 91 may also include an edge detection unit 138 for detecting an edge portion of an input image the result of which is taken into account, for example, in halftone processing (the edge detection unit 138 may be provided before or after the CMM 131).

A part or all of the functions of the printer driver 91 may be provided in an image forming apparatus. For example, an image forming apparatus according to an embodiment of the present invention may include the function of the halftone processing unit 135 as described later. Also, an image forming system (printing system) may be formed by combining an image processing apparatus including the printer driver 91 and an image forming apparatus.

Figure 12:
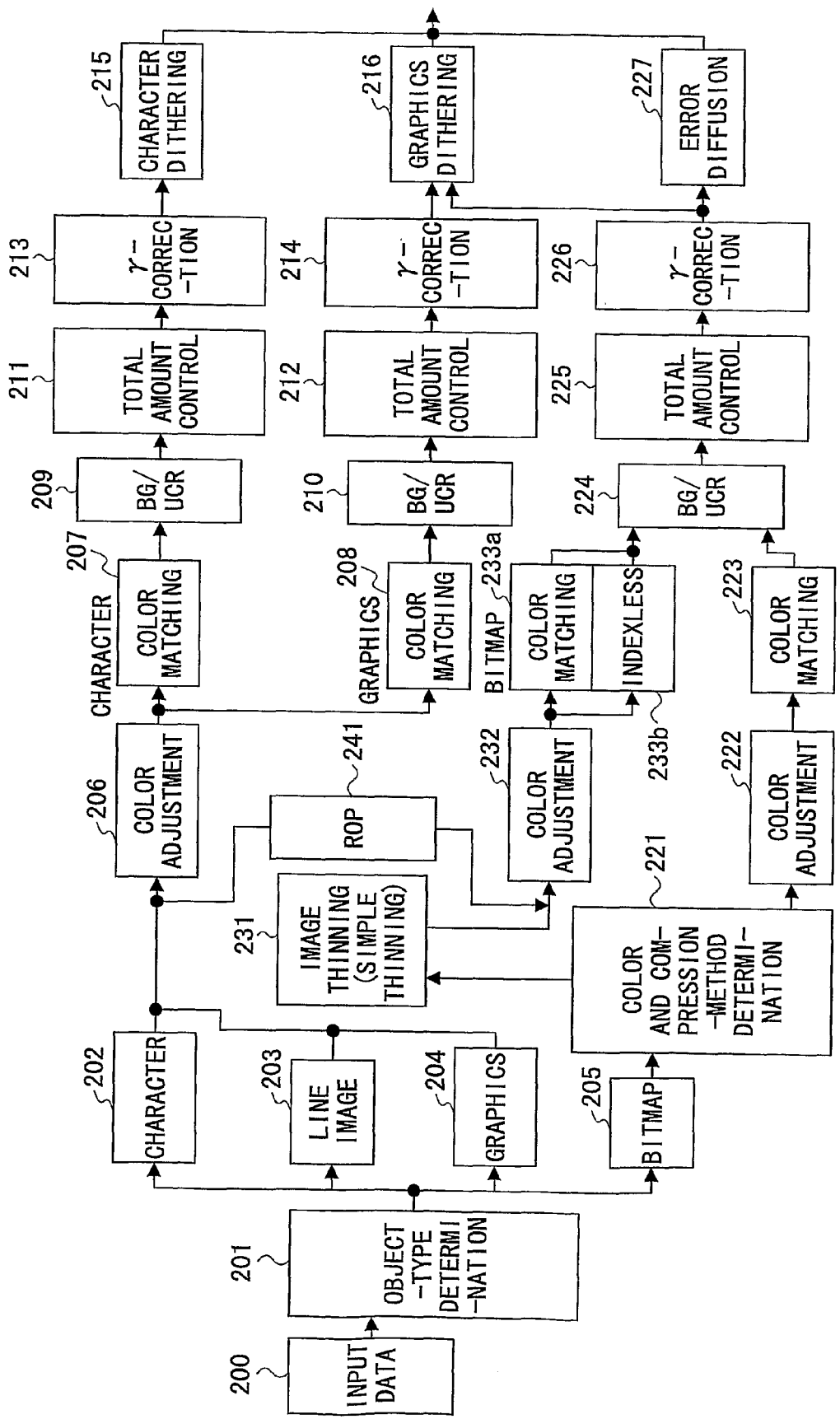
FIG. 12 is a block diagram illustrating exemplary image processing by the printer driver shown in FIG. 11.

Exemplary image processing up to halftone processing performed by the printer driver 91 of the host 90 is described below with reference to a block diagram shown in FIG. 12.

When a print command is output from an application program running on a data processing apparatus such as a personal computer, the printer driver 91, in an object-type determination process 201, determines the types of objects in input data 200. Each of the objects, which include character image data 202, line image data 203, graphics image data 204, and bitmap image data 205, is processed through a corresponding processing path.

On the character image data 202, the line image data 203, and the graphics image data 204, color adjustment process 206 is first performed. Then, a color matching process 207, a BG/UCR process 209, a total amount control process 211, a γ-correction process 213, and a character dithering process (halftone processing) 215 are further performed on the character image data 202. On the line image data 203 and the graphics image data 204, a color matching process 208, a BG/UCR process 210, a total amount control process 212, a γ-correction process 214, and a graphics dithering process (halftone processing) 216 are further performed.

On the bitmap image data 205, a color and compression-method determination process 221 is first performed. When the bitmap image data 205 have more than two colors, a color adjustment process 222, a color matching process 223, a BG/UCR process 224, a total amount control process 225, a γ-correction process 226, and an error diffusion process (halftone processing) 227 are further performed. When the bitmap image data 205 have one or two colors, an image thinning process 231, a color adjustment process 232, a color, matching process 233a or an indexless process 233b (a process where no color matching is performed), the BG/UCR process 224, the total amount control process 225, the γ-correction process 226, and the error diffusion process (halftone processing) 227 are further performed.

Also, the line image data 203 and the graphics image data 204 may be processed through a different processing path that branches to an ROP process 241 instead of proceeding to the color adjustment process 206. In this case, following the ROP process 241, the color adjustment process 232 and the subsequent processes are performed on the line image data 203 and the graphics image data 204. In the example shown in FIG. 12, dithering (halftone processing) is performed on the character image data 202, the line image data 203, and the graphics image data 204. Alternatively, an error diffusion process may be performed on those objects as in the case of the bitmap image data 205.

After the above processes, all the objects are combined again into a single set of image data.

A correction method according to an embodiment of the present invention of correcting defects caused by abnormal nozzles is applied to halftone processing. More particularly, a correction method according to an embodiment of the present invention makes it possible to cover unfilled pixels caused by abnormal nozzles by using a multilevel error diffusion process for halftone processing.

As halftone processing methods, "dithering" and "error diffusion" are popularly used. In "dithering", pixel data are quantized by comparing pixel values with values in a threshold matrix. In "error diffusion", quantization errors of already-processed pixels are taken into account in the quantization process of a next pixel. Dithering provides a higher processing speed and error diffusion provides better image quality. Thus, the two methods have different advantages and therefore, an appropriate one of the two methods is selected depending on, for example, the recording mode.

However, with the improvement in processing speed of computers, the time necessary for halftone processing employing error diffusion has become comparable to the time necessary for halftone processing employing dithering. Therefore, most of current inkjet recording apparatuses employ error diffusion for halftone processing.

Figure 13:
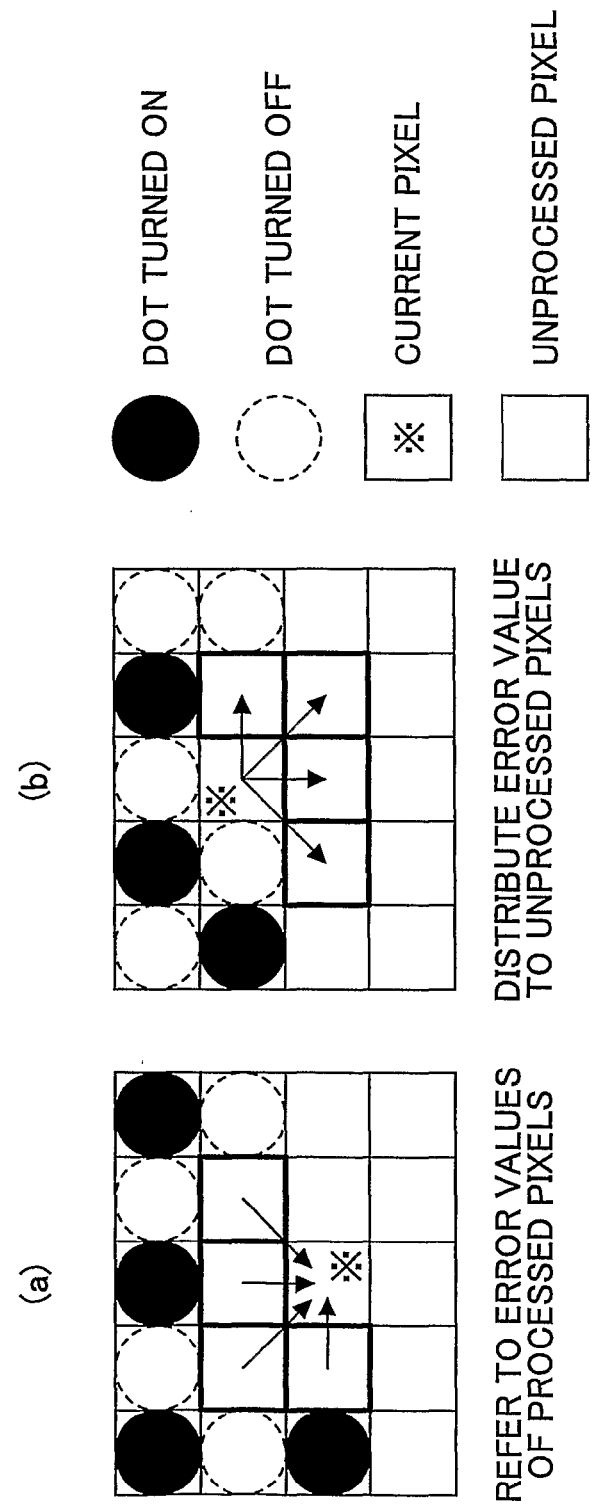
FIG. 13 is a drawing illustrating exemplary error diffusion processes.
Figure 14:
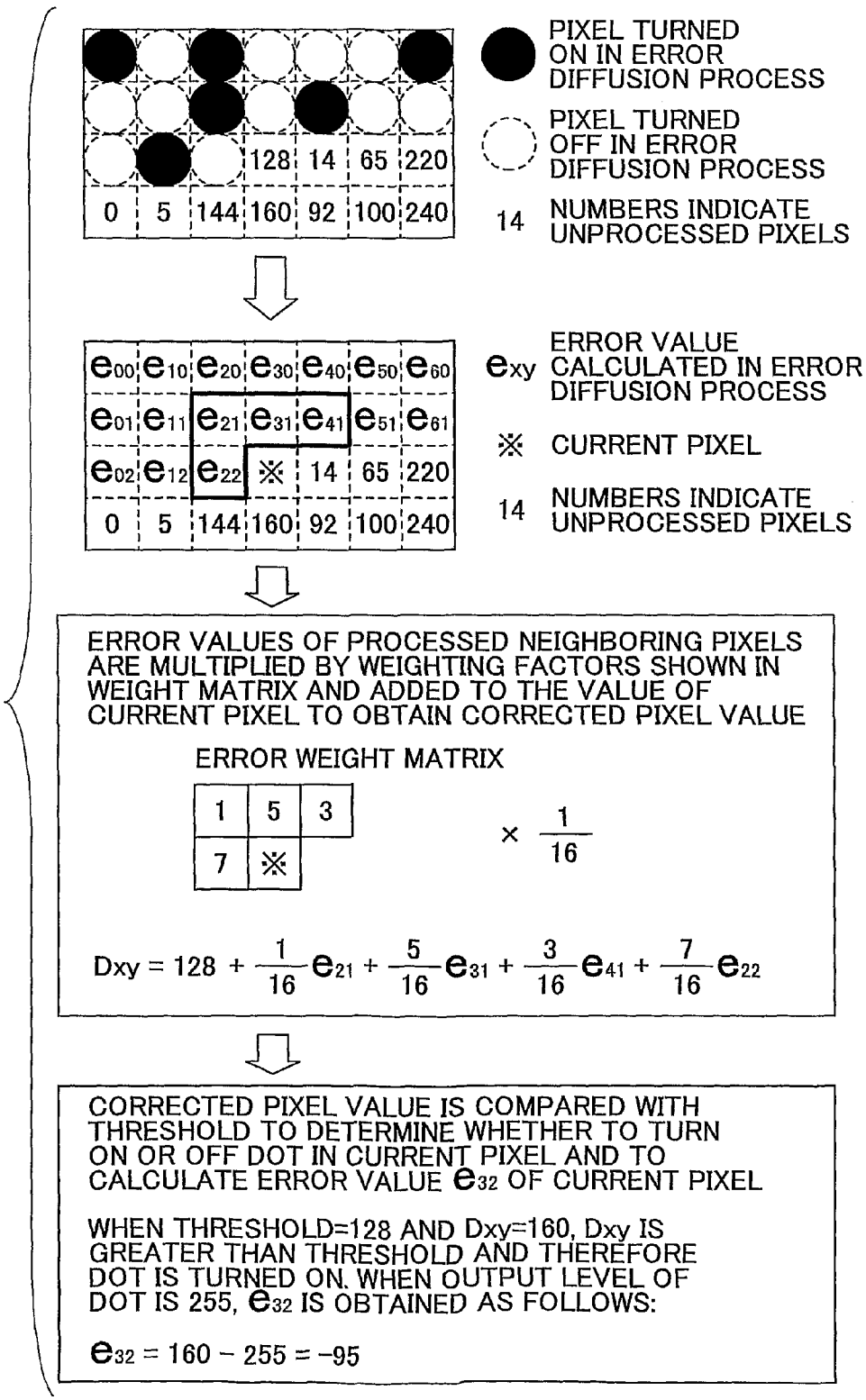
FIG. 14 is a drawing illustrating an error diffusion process of FIG. 13(a) in more detail.

FIG. 13 shows two exemplary error diffusion processes. FIG. 13(a) shows an error diffusion process where quantization error values of processed pixels are used (referred to) in calculations for the next pixel. FIG. 13(b) shows an error diffusion process where a quantization error value is multiplied by a predetermined factor and distributed to unprocessed pixels in advance. FIG. 14 shows the error diffusion process of FIG. 13(a) in more detail.

Figure 15A:
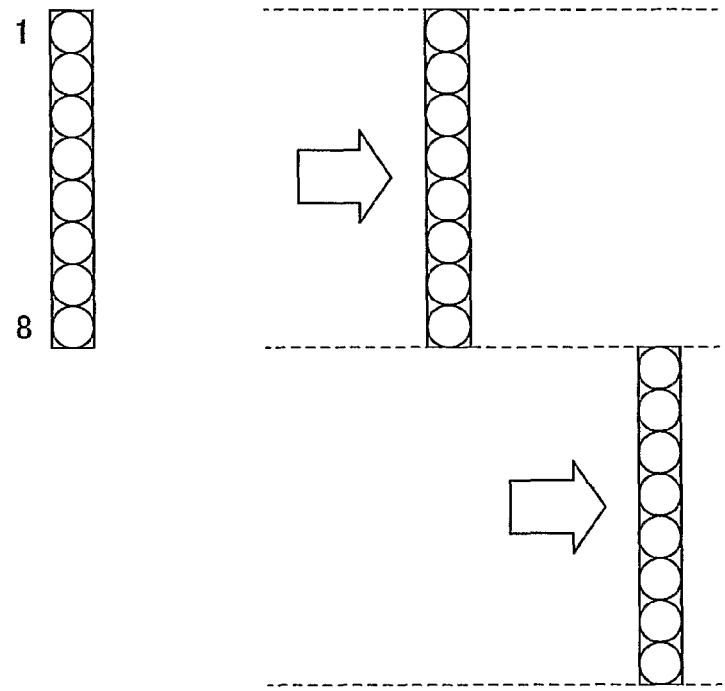
FIGS. 15A and 15B are drawings used to describe the correspondence between dots and nozzles in one-pass recording.
Figure 15B:
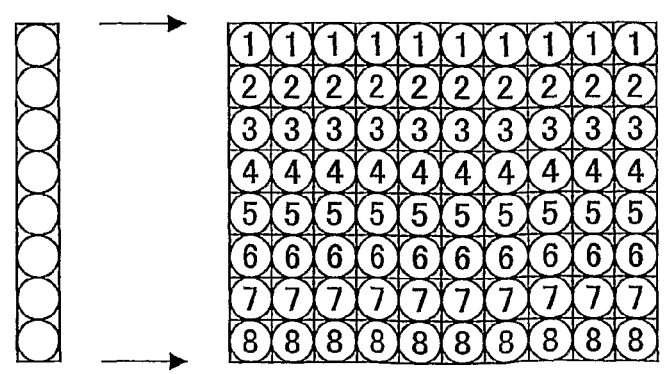
Figure 16A:
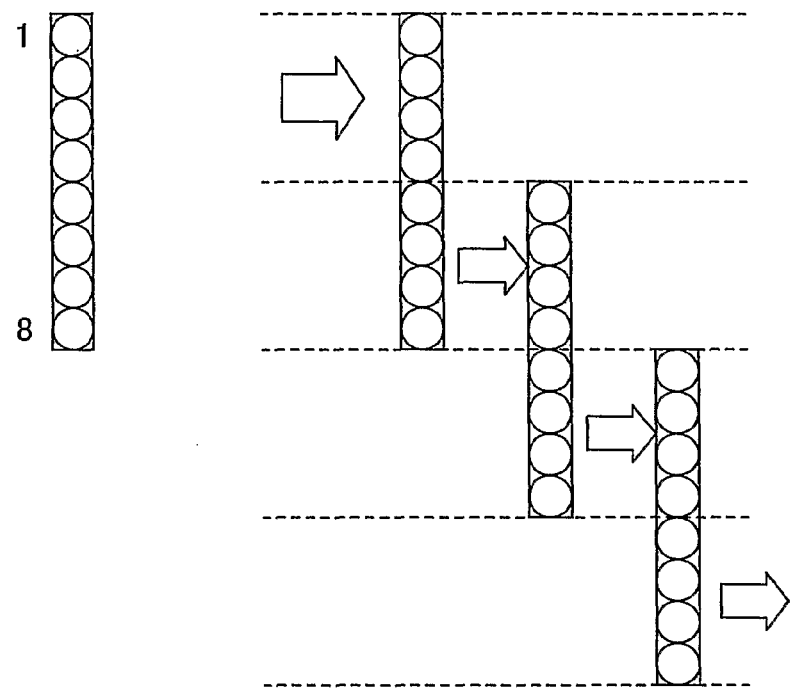
FIGS. 16A and 16B are drawings used to describe the correspondence between dots and nozzles in two-pass recording.
Figure 16B:
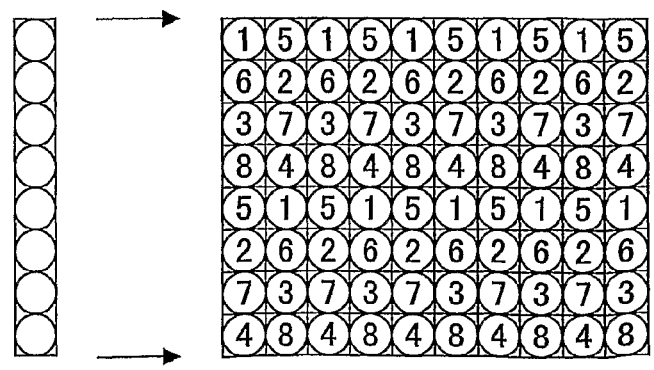

FIGS. 15A and 15B are drawings used to describe the correspondence between dots and nozzles in one-pass recording. FIGS. 16A and 16B are drawings used to describe the correspondence between dots and nozzles in two-pass recording. In FIGS. 15A through 16B, it is assumed that a recording head having eight nozzles is used. However, the descriptions below may also be applied to a recording head having several hundreds of nozzles.

One-pass recording where an image is recorded with one recording pass at a resolution corresponding to the pitch between nozzles on a recording head as shown in FIG. 15A is best suited to record an image at high speed without reducing the amount of information. With the one-pass recording, however, columns of dots corresponding to the head width are recorded with the same combination of nozzles as shown in FIG. 15B. In this case, ink-jetting failure of a nozzle results in a horizontal white stripe as shown in FIG. 17(a).

Meanwhile, in multi-pass recording, an image is recorded with multiple recording passes and nozzles used to form respective dots are varied column by column (see, for example, Japanese Patent Application Publication No. 5-309874 and Japanese Patent Application Publication No. 2001-063008).

FIGS. 16A and 16B show two-pass recording as an example of multi-pass recording. In two-pass recording, as shown in FIG. 16A, one column of dots corresponding to the head width is formed by two passes using a half of the nozzles of a recording head in each pass. Therefore, as shown in FIG. 16B, a pair of nozzles are alternately used for a corresponding dot position in respective passes. For example, nozzle 1 and nozzle 5 are alternately used for the first dot position in respective passes.

In this case, if nozzle 3 is an abnormal nozzle (in this example, a failed nozzle), dot positions corresponding to nozzle 3 are left blank as shown in FIG. 17(b). Here, the blank dot positions can be filled as shown in FIG. 17 (c) by using another one (nozzle 7) of a pair of nozzles (3 and 7) forming the corresponding horizontal lines as a substitute for nozzle 3. Although two-pass recording is used as an example in the above descriptions, this correction method may also be applied to multi-pass recording using any number of recording passes.

One disadvantage of multi-pass recording is that the recording speed decreases as the number of passes increases. Since the recording speed is an important factor not only for a high-speed recording mode but also for a high-quality recording mode in a current image forming apparatus, it is desired to reduce the number of passes in multi-pass recording as much as possible.

On the other hand, reducing the number of passes reduces the number of nozzles usable as substitute nozzles and therefore increases the workload of the substitute nozzles. The increased workload may in turn reduce the service life of the substitute nozzles and turn them into abnormal nozzles.

Also, there is a case where a recording process has to be divided into many passes due to design restrictions. For example, for a thermal inkjet recording apparatus employing film boiling caused by heat, multi-pass recording where nozzles are driven intermittently is preferably used over one-pass recording where nozzles are driven continuously in order to prevent accumulation of heat.

Further, in any type of inkjet recording apparatus, there is a case where a drive waveform for stably jetting ink droplets does not fit in a jetting cycle of a recording head. In such a case, it is practically impossible to form successive dots with one nozzle and therefore it is difficult to correct defects with two-pass recording as shown in FIG. 17(c).

The recording speed and the workload of substitute nozzles in a correction process by multi-pass recording can be adjusted to some extent by intelligently managing the combination and the use frequency of substitute nozzles according to image data. This method, however, requires a separate mechanism for calculating and/or storing the use frequency of substitute nozzles according to image data. Also, the adjustable range of the recording speed and workload becomes narrower as the number of passes (i.e., the number of substitute nozzles) decreases.

Meanwhile, line-type image forming apparatuses employing a recording head covering the width of paper provide higher recording speed. In a line-type image forming apparatus, however, since paper is caused to pass under a fixed recording head, it is basically impossible to perform multi-pass recording (as an exception, with a line-type image forming apparatus where paper is wound around a drum, it is possible to implement a recording method similar to multi-pass recording by causing the paper to go under the recording head multiple times).

An aspect of the present invention makes it possible to solve or reduce the above problems in related-art technologies and to correct image defects caused by abnormal nozzles with a simple method. According to an embodiment of the present invention, a dot in a position corresponding to an abnormal nozzle is turned off (left blank) and its quantization error is diffused to neighboring pixels in an error diffusion process to cover the blank dot, and also removal (thinning) or resizing of dots are performed according to absorption characteristics of paper and/or the order of superposed ink droplets of different colors.

An exemplary method of correcting image defects caused by abnormal nozzles according to an embodiment of the present invention is described below with reference to FIG. 18. The exemplary method is based on the error diffusion process shown by FIG. 13(a). However, the exemplary method may also be applied to the error diffusion process shown by FIG. 13(b) where a quantization error is distributed to unprocessed pixels.

Figure 18:
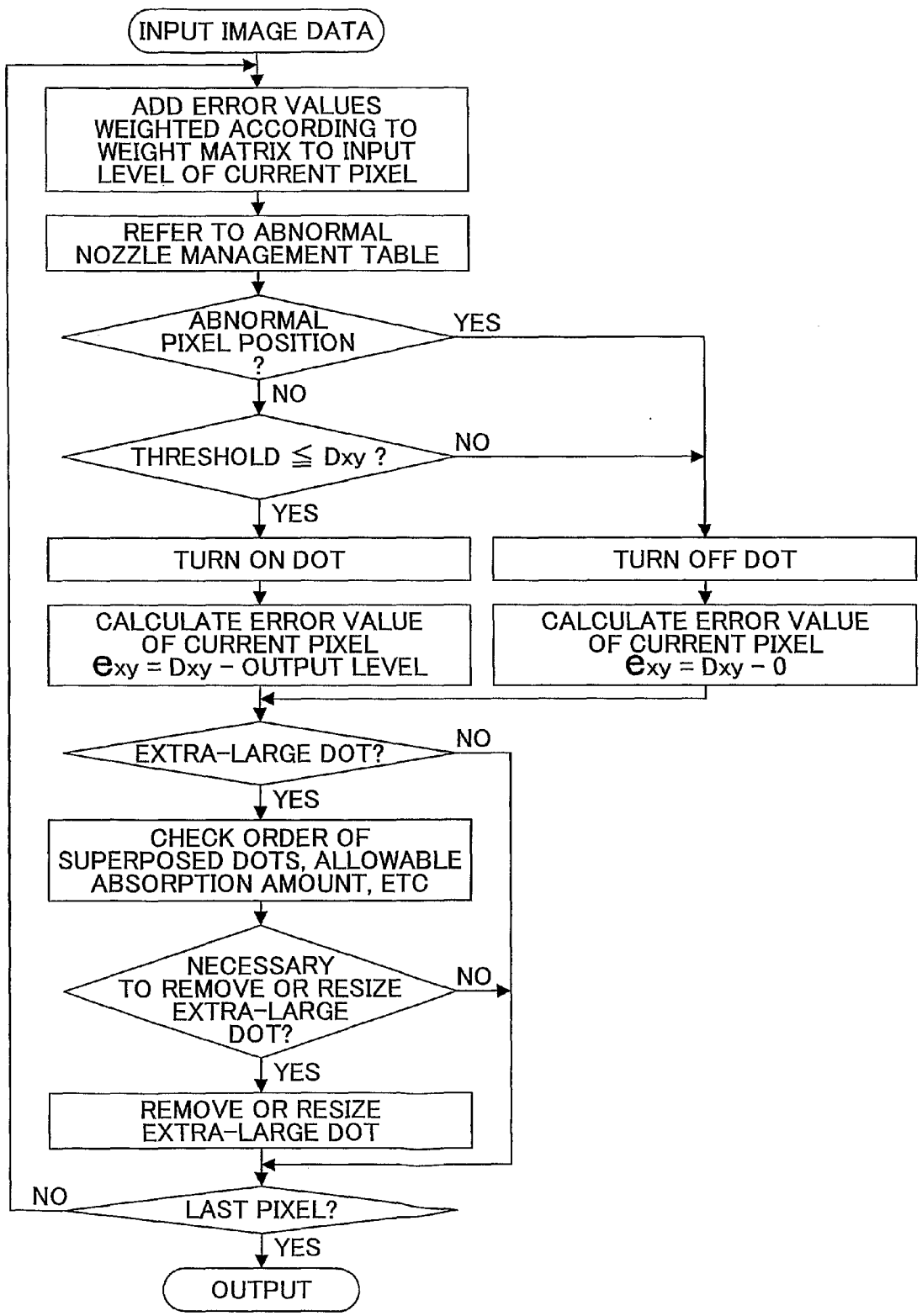
FIG. 18 is a flowchart showing a correction method employing an error diffusion process according to an embodiment of the present invention.

In an error diffusion process shown in FIG. 18, input image data are processed pixel by pixel. Error values of processed neighboring pixels are weighted according to a weight matrix and the weighted error values are added to the input level of the current pixel to obtain a corrected pixel value Dxy. Then, whether the position of the current pixel (current pixel position) is a pixel position to be recorded by an abnormal nozzle (abnormal pixel position) is determined by referring to an abnormal nozzle management table. The abnormal nozzle management table indicates the correspondence between abnormal nozzles and pixel positions and is obtained based on a recording sequence table and abnormal nozzle data.

If the current pixel position is not an abnormal pixel position, the error diffusion process is continued in a normal manner. Meanwhile, if the current pixel position is an abnormal pixel position, the dot for the current pixel position is turned off (left blank) even when the corrected pixel value Dxy is greater than or equal to a threshold and the entire corrected pixel value Dxy is used as an error value.

Figure 19:
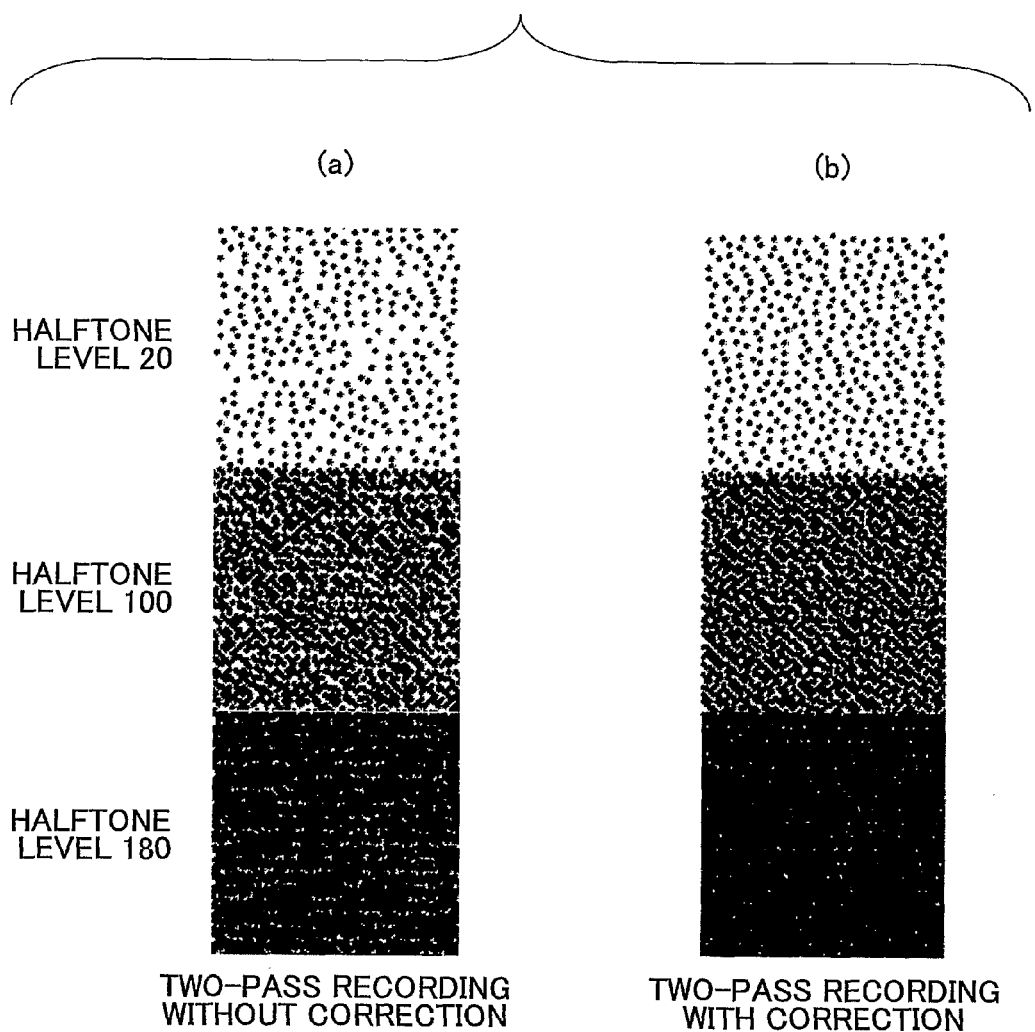
FIG. 19 is a drawing showing exemplary images (a) where defects caused by abnormal nozzles are not corrected and exemplary images (b) where defects caused by abnormal nozzles are corrected.

The error value of the blank dot (the dot turned off) caused by an abnormal nozzle is then used in calculations of neighboring pixels to adjust dots of the neighboring pixels. As a result, the blank dot is covered by the dots of the neighboring pixels. FIG. 19 shows images output with or without the above correction process. FIG. 19(a) shows images formed by two-pass recording without performing the above correction process. FIG. 19(b) shows images formed by two-pass recording after performing the above correction process. Those images demonstrate that blank dots are covered by the correction process.

Figure 20:
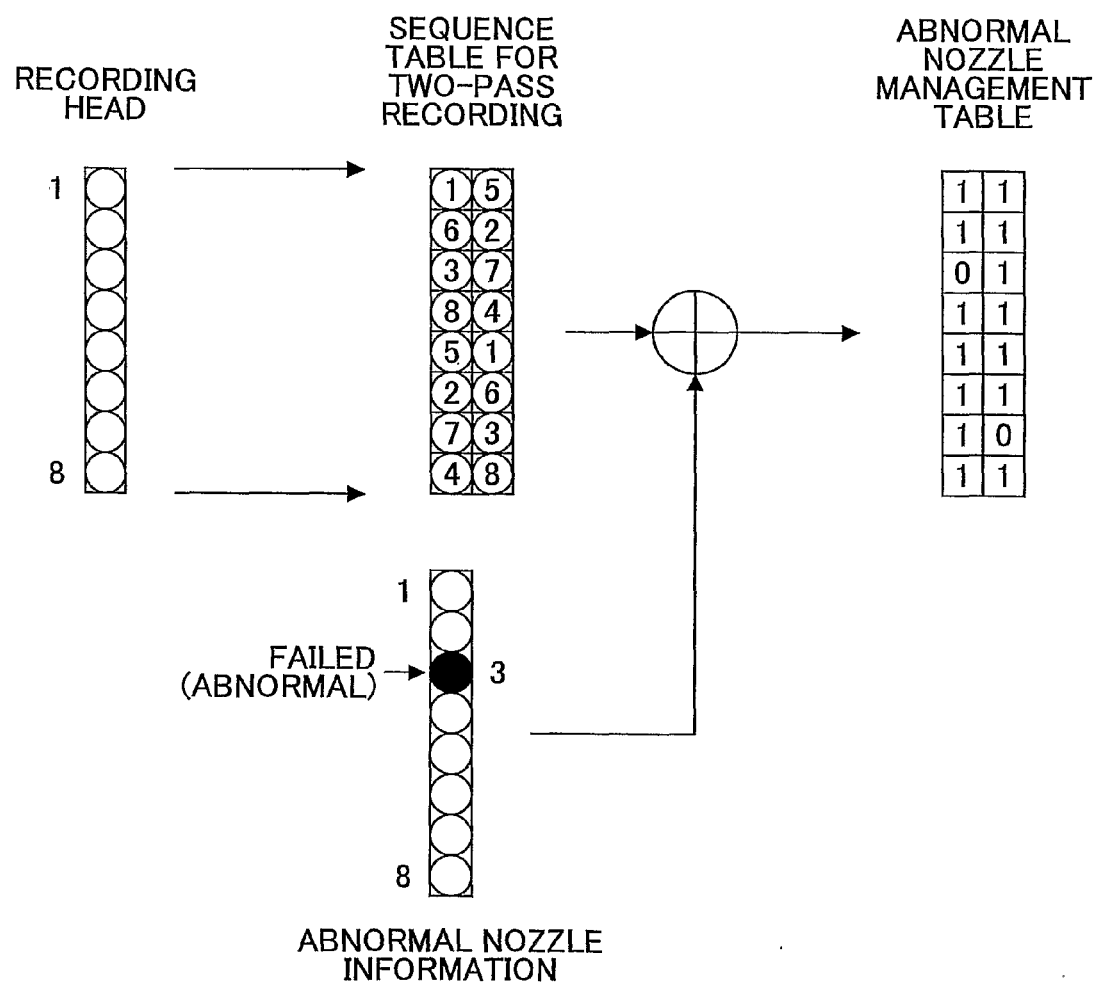
FIG. 20 is a drawing illustrating a process of generating an abnormal nozzle management table.

The abnormal nozzle management table is described below in more detail. The abnormal nozzle management table may be a simple table as shown in FIG. 20. A recording sequence table indicating the correspondence between nozzles and pixel positions is normally used in image processing by a printer driver. The abnormal nozzle management table may be generated based on the recording sequence table and abnormal nozzle information (abnormal nozzle data).

Figure 21A:
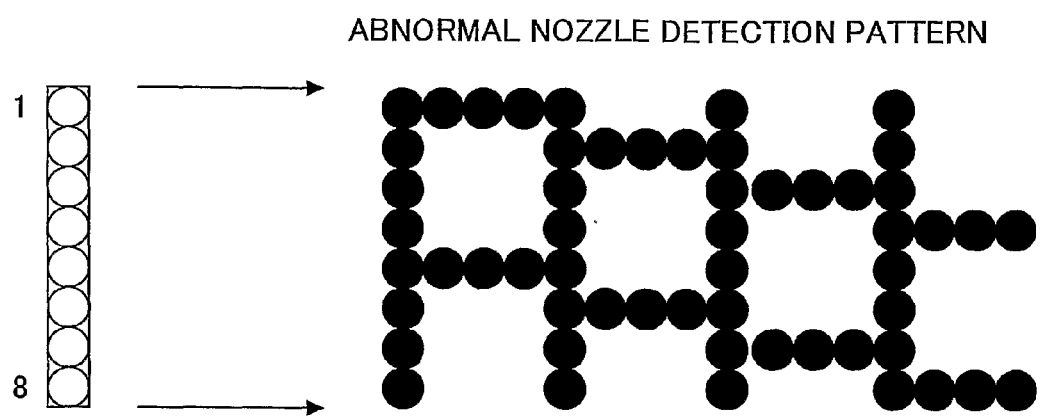
FIGS. 21A and 21B show examples of abnormal nozzle detection patterns.
Figure 21B:
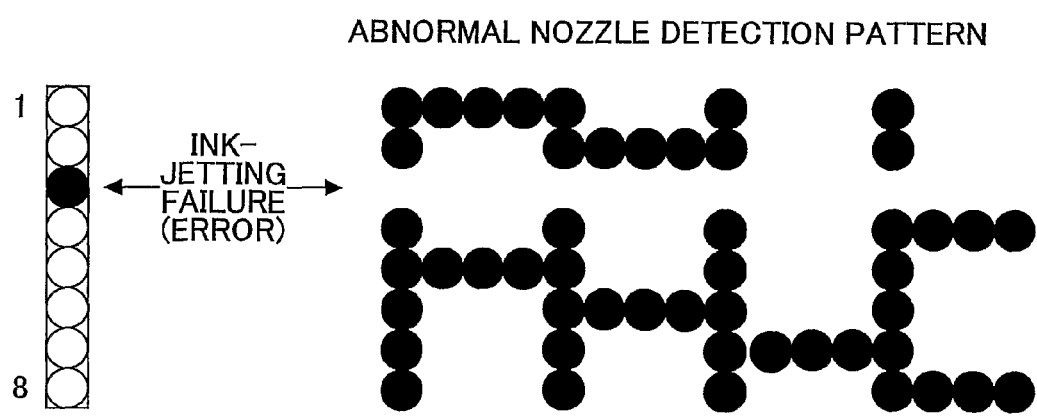

The abnormal nozzle information can be obtained by examining an abnormal nozzle detection pattern as shown in FIGS. 21A and 21B and the abnormal nozzle management table can be easily generated based on the abnormal nozzle information.

The abnormal nozzle detection pattern of FIG. 21A is an example of a check pattern used to determine the presence of an abnormal nozzle by visually inspecting horizontal lines formed by respective nozzles. For example, if nozzle 3 is abnormal, dots in the abnormal detection pattern corresponding to nozzle 3 are left blank as shown in FIG. 21B.

Figure 22A:
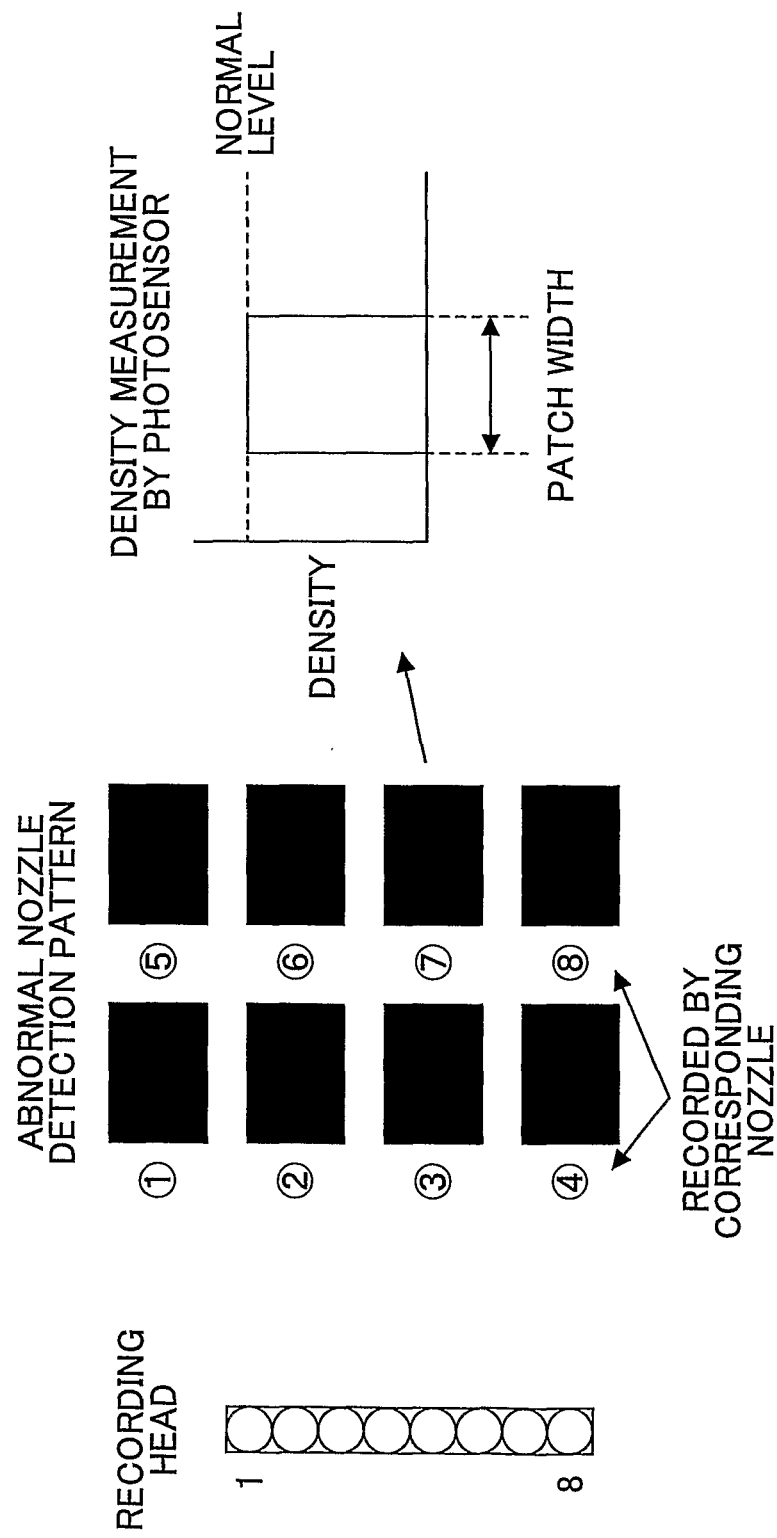
FIGS. 22A and 22B show other examples of abnormal nozzle detection patterns.
Figure 22B:
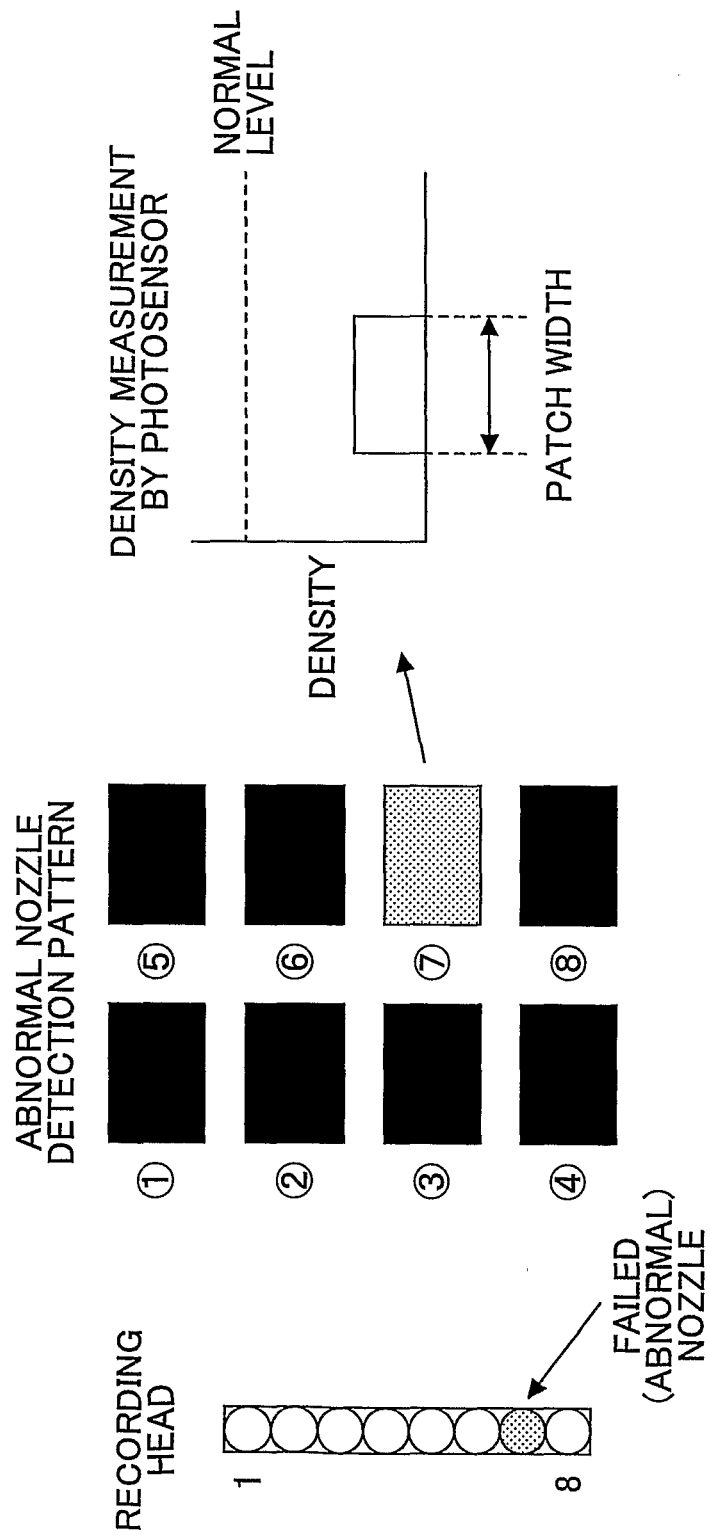

FIG. 22A shows another exemplary abnormal nozzle detection pattern used to automatically detect an abnormal nozzle with a scanning unit or a photosensor. For example, if nozzle 7 is abnormal, density of a rectangle (measured by, for example, a photosensor) in the abnormal nozzle detection pattern corresponding to nozzle 7 becomes less than a normal level as shown in FIG. 22B.

Thus, in this embodiment, a correction process for correcting or covering an image defect caused by an abnormal nozzle is incorporated in halftone processing for converting multilevel data into a dot pattern. Unlike a correction method employing multi-pass recording, this embodiment makes is possible to perform a correction process without greatly reducing the recording speed. Also, since a correction process is incorporated in a process of converting multilevel data into a dot pattern, this embodiment makes it possible to prevent use of excessive amount of ink that may disturb the natural arrangement of dots.

Thus, the above embodiment of the present invention makes it possible to correct or cover a defect such as a white stripe in an image caused by an abnormal nozzle such that they are not easily recognizable by human eyes, without increasing costs of recording heads and without reducing the recording speed.

Further, using an abnormal nozzle management table as criteria for generating dots in an error diffusion process makes it possible to apply a correction process to the exact pixels corresponding to an abnormal nozzle. According to the above embodiment, a dot for a pixel position corresponding to an abnormal nozzle is turned off (left blank) and its quantization error value is used in calculations of neighboring pixels to cover the blank dot. In other words, an irregularity in a dot pattern caused by a correction process is covered by diffusing the irregularity to neighboring pixels.

Next, the relationship between the above correction process and halftone processing in an inkjet recording apparatus is described.

Generally, image data are multilevel data where each pixel is represented, for example, by 8 bits (256 levels). Meanwhile, in an inkjet recording apparatus for outputting such image data, each pixel is normally represented by one to three bits.

Figure 23A:
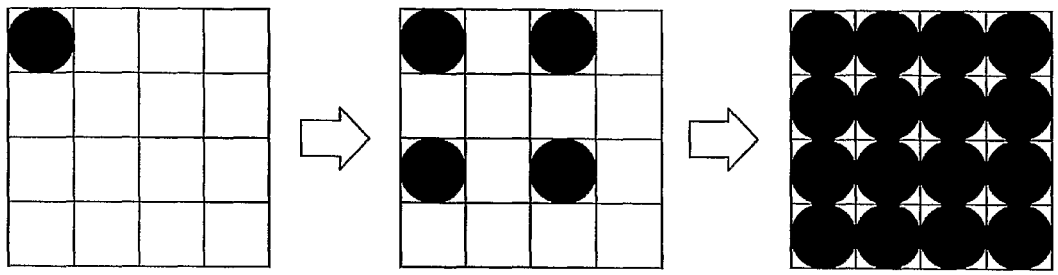
FIGS. 23A through 23C are drawings illustrating a binarization process and multilevel conversion processes.
Figure 23B:
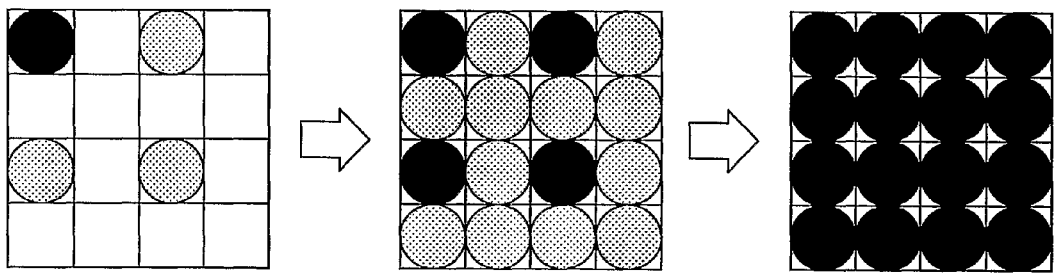
Figure 23C:
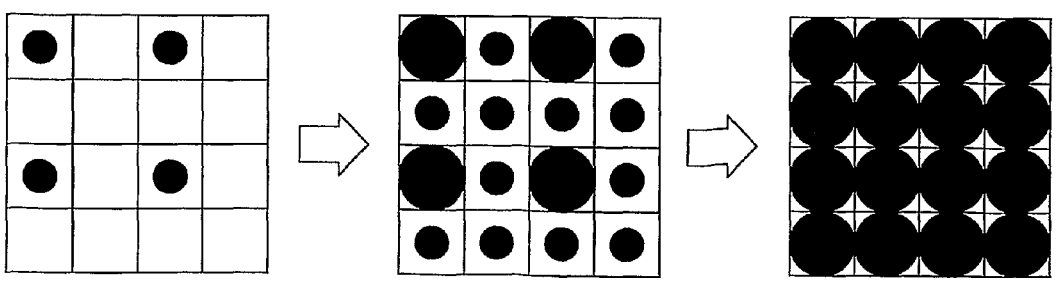

FIGS. 23A through 23C are drawings illustrating dot patterns generated by a binarization process (binary quantization) and multilevel conversion processes (multilevel quantization). FIG. 23A shows dot patterns generated by a binarization process; FIG. 23B shows dot patterns generated by a multilevel conversion process employing density modulation; and FIG. 23C shows dot patterns generated by a multilevel conversion process employing dot-size modulation.

In the multilevel conversion process employing density modulation, recording units provided for inks with different density levels are used. Such recording units for different density levels may be treated in the same manner as recording units for different colors. Also, gradation levels represented by inks with different density levels can be handled in the error diffusion process without any problem. Therefore, the correction process of the above embodiment can be applied without any substantial change to the multilevel conversion process employing density modulation.

In an image forming apparatus using the multilevel conversion process employing dot-size modulation, there is a case where a nozzle becomes unable to (stably) form dots of a certain size but is still able to form dots of other sizes correctly.

If such a nozzle is treated as a completely failed nozzle that cannot jet ink droplets at all, the correction process may be applied even to a dot pattern that can be formed correctly (overcorrection). (This description does not apply to a case where recording heads are provided for respective dot sizes. In such a case, the recording heads are treated as recording units for different colors as in the multilevel conversion process employing density modulation.)

For the above reason, in an image forming apparatus using the multilevel conversion process employing dot-size modulation, multiple abnormal nozzle management tables are provided for respective dot sizes and are switched depending on the threshold levels used in the multilevel conversion process. This approach makes it possible to apply the correction process of this embodiment only to dots of a particular size that cannot be formed correctly.

Thus, when a multilevel error diffusion process supporting n gradation levels (n≧2) is employed in an inkjet recording apparatus capable of changing dot sizes, it is preferable to perform correction processes for the respective dot sizes. With this method, when a nozzle becomes unable to (stably) jet dots of a particular dot size, the correction process is applied only to dots of the particular dot size. This in turn makes it possible to prevent "overcorrection" and thereby to prevent reduction in total image quality.

Figure 24:
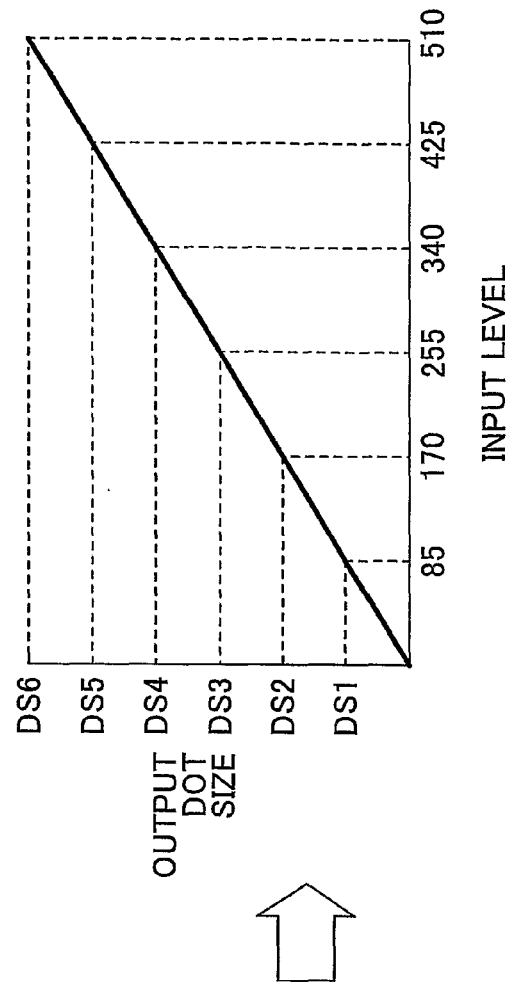
FIG. 24 is a drawing illustrating an exemplary definition of dot sizes represented by more than 8 bits.

Meanwhile, when a multilevel error diffusion process is employed, it is possible to define dot sizes greater than the maximum input level as shown in FIG. 24. Normally, input image data are represented by 8 bits (the maximum level is 255). Assuming that 0 indicates white and 255 indicates a solid color, dot size DS3 shown in FIG. 24(a) is the exact size that can fill a pixel (a dot with dot size DS3 or a dot capable of filling a pixel is hereafter called a "full-size dot").

If an inkjet recording apparatus is capable of forming dots larger than dot size D3, such dots correspond to input levels greater than 255. In the error diffusion process, the input level of a current pixel is corrected by adding weighted error values of neighboring pixels. Therefore, the corrected input level may sometimes exceed 255. When dots in pixels corresponding to an abnormal nozzle are turned off in a correction process, error values of those pixels become greater and this increases the probability that dots with large sizes (such as DS4 and DS5 (DS3<DS4<DS5)) are generated.

Figure 25:
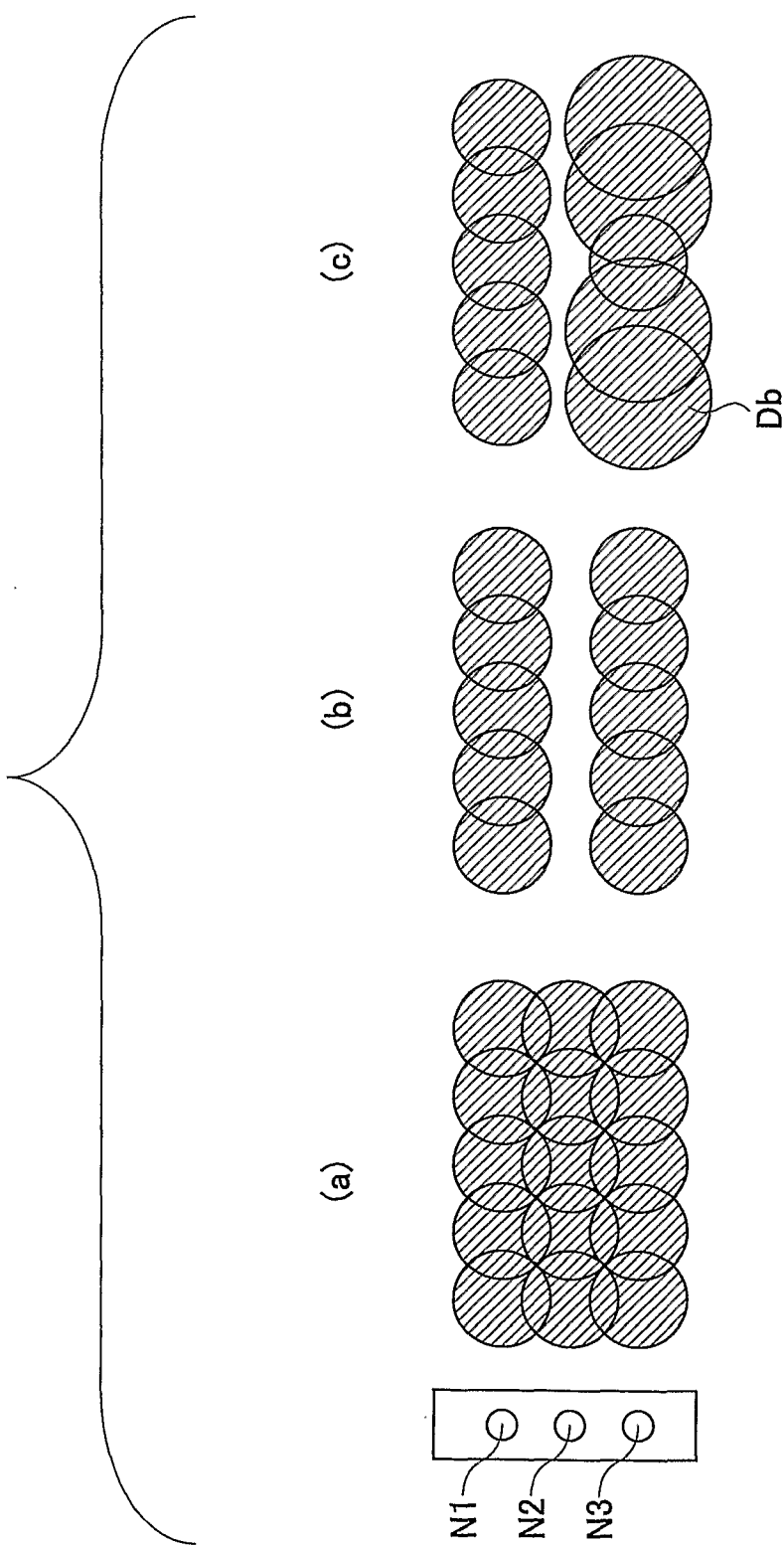
FIG. 25 is a drawing illustrating an exemplary method of covering a white stripe using dots with a dot size represented by more than 8 bits.

FIG. 25 is a drawing illustrating an exemplary method of covering (or correcting) a white stripe in a case where dots (hereafter called "extra-large dots") with a dot size greater than that corresponding to the input level of 255 are available (i.e., dots larger than the full-size dot). Extra-large dots may also be called "extra-large droplets" and full-size dots may also be called "full-size droplets".

FIG. 25(a) shows a correctly formed dot pattern, and FIG. 25(b) shows a dot pattern formed when nozzle N2 in the center becomes unable to jet droplets. As shown in FIG. 25(b), the center area of the dot pattern is left blank which is recognized by human eyes as a white stripe. If a dot size corresponding to the input level of 255 is the maximum dot size supported, it is not possible to cover a white stripe in a fill pattern as shown in FIG. 25(b).

Meanwhile, if dots (extra-large dots) Db with a dot size greater than that corresponding to the input level of 255 are available, the white stripe can be covered by the extra-large dots Db as shown in FIG. 25(c). In this example, instead of increasing the sizes of all dots (droplets) jetted from nozzles adjacent to the failed nozzle, only sizes of selected dots are increased by the error diffusion process such that the integrity of the dot pattern is maintained. This method makes it possible to prevent jaggies and overcorrection (e.g., increasing even the size of an isolated dot) and makes it possible to appropriately correct image defects caused by failed nozzles.

Still, the above method has room for improvement. In inkjet recording, ink droplets jetted onto a recording medium are absorbed into the recording medium (or a receiving layer of the recording medium) and thereby form an image (descriptions regarding hot melt inkjet printing, where wax ink is solidified on a recording medium, are omitted here because problems described in the present application do not normally occur with the hot melt inkjet printing).

Figure 30:
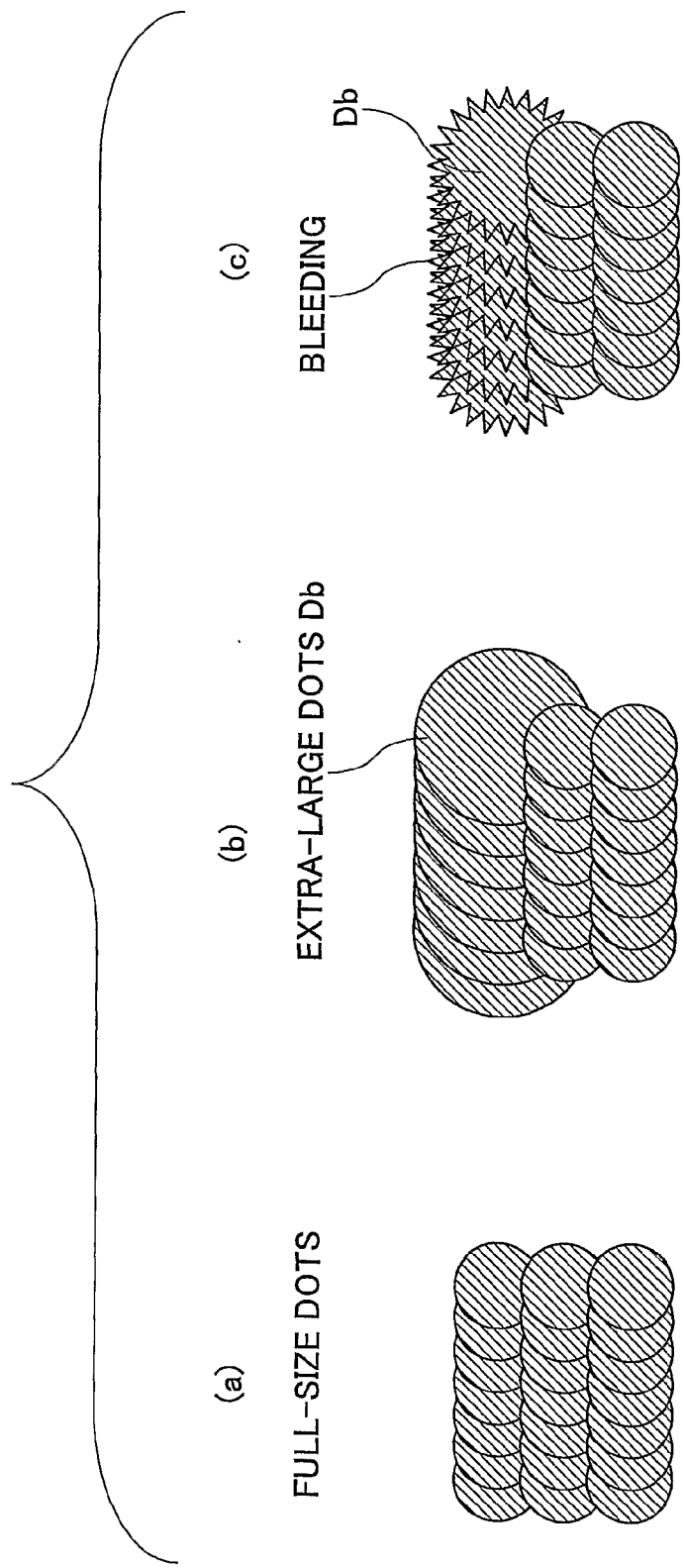
FIG. 30 is a drawing illustrating deterioration of quality of an edge portion of an image caused by extra-large dots.
Figure 31:
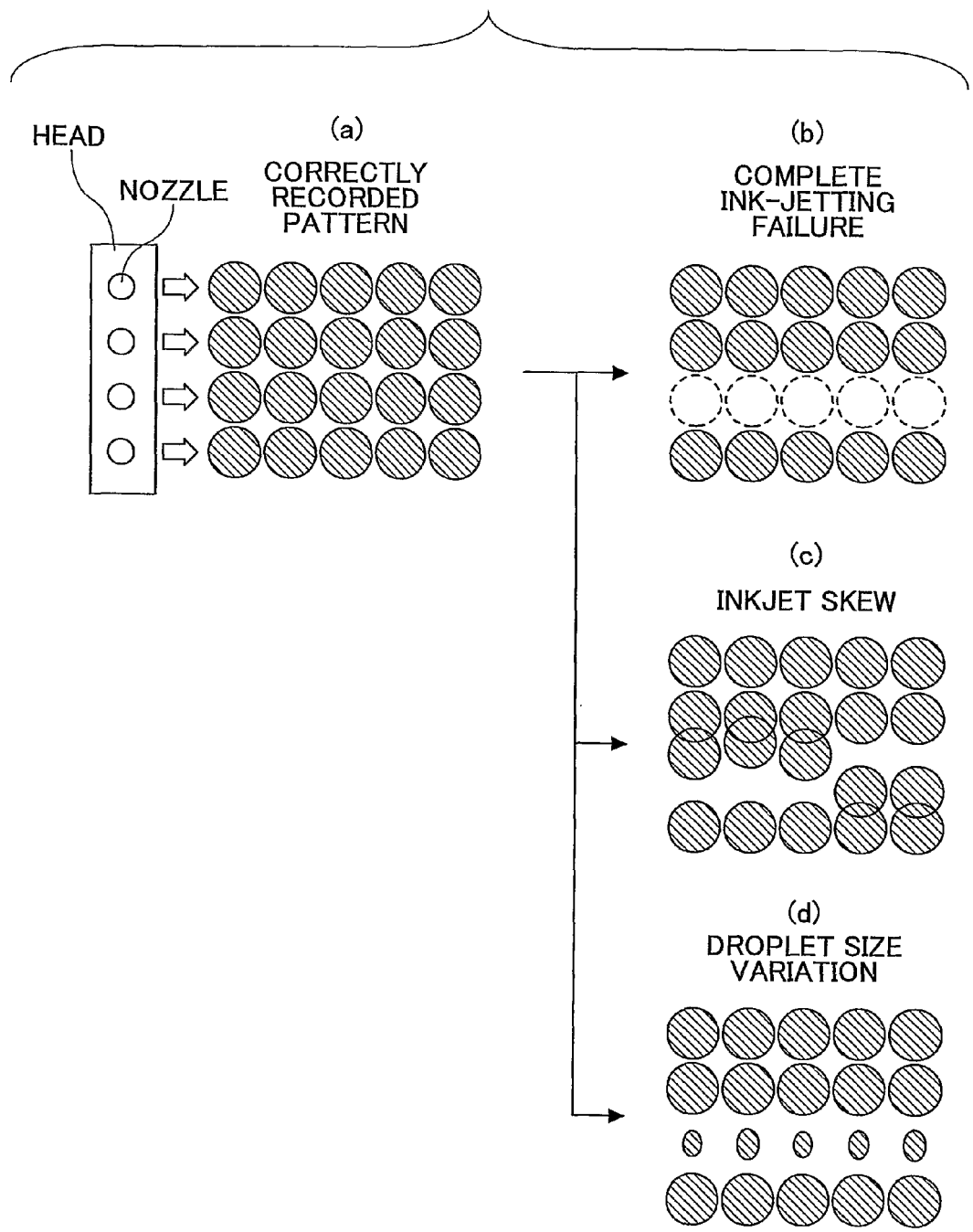
FIG. 31 is a drawing showing examples of a normally-recorded image and abnormally-recorded images.

In inkjet recording, the degree of penetration of an ink into a recording medium varies depending on the absorption characteristics of the ink and the recording medium and it greatly affects the recording quality. For example, if some of full-size dots (with a size enough to fill a pixel) shown in FIG. 30(a) are replaced with extra-large dots Db as shown in FIG. 30(b), the extra-large dots may cause bleeding in an edge portion (or at a color boundary) of an image and reduce the image quality.

Meanwhile, it is known that when two or more droplets of different colors are superposed on a recording medium, the intensity of the color of a droplet adhered first to the recording medium becomes greater than the intensity of other colors. This phenomenon is described in more detail with reference to FIGS. 26 and 27.

Figure 26:
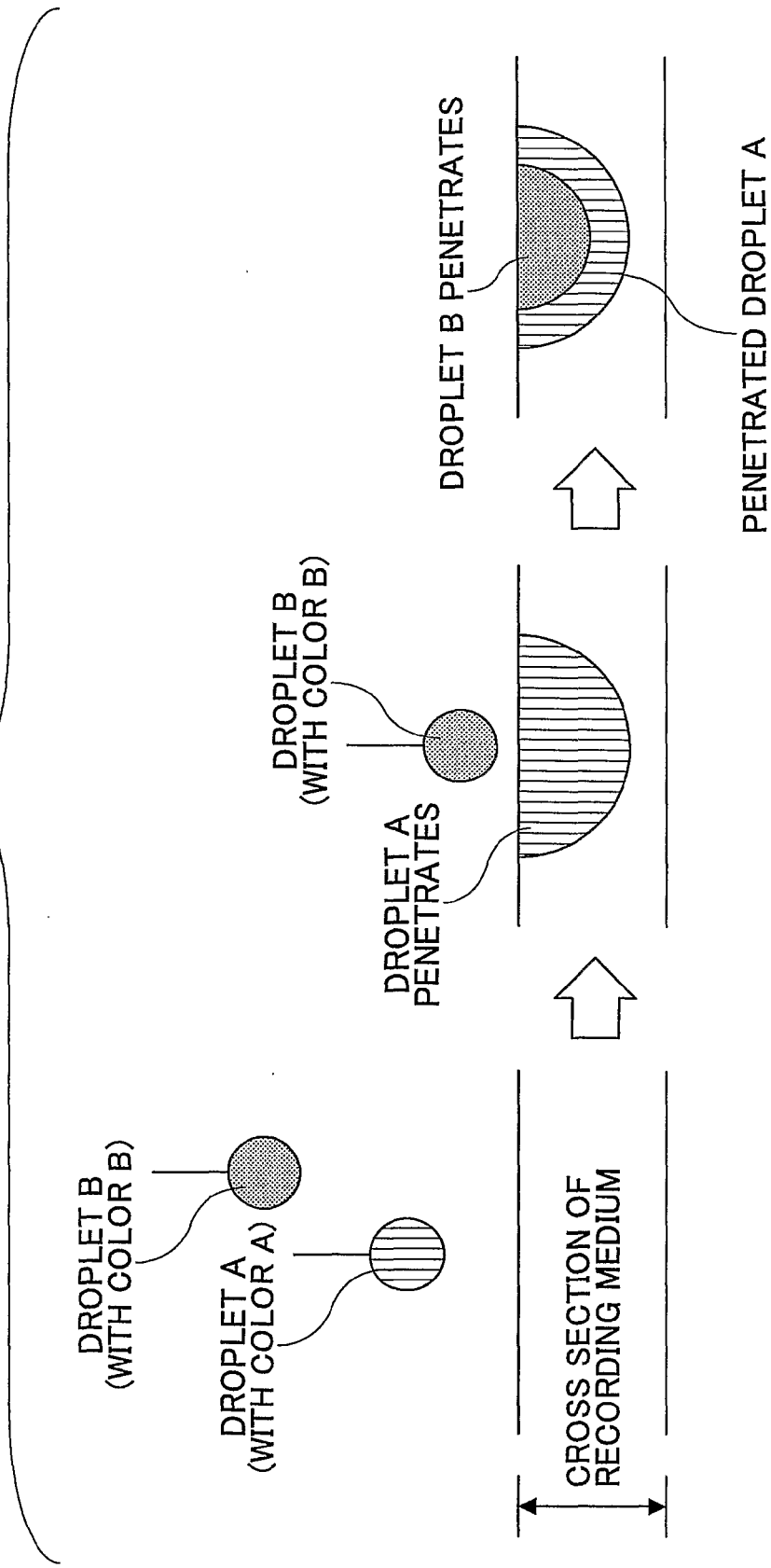
FIG. 26 is a drawing illustrating a penetration process of superposed dye inks with different colors.

FIG. 26 is a drawing illustrating a penetration process of dye inks. As shown in FIG. 26, a first dye ink jetted first onto a recording medium spreads widely in the recording medium and a second dye ink jetted second onto the recording medium cannot spread as widely as the first dye ink. As a result, the color of the first dye ink becomes more prominent than that of the second dye ink.

Figure 27:
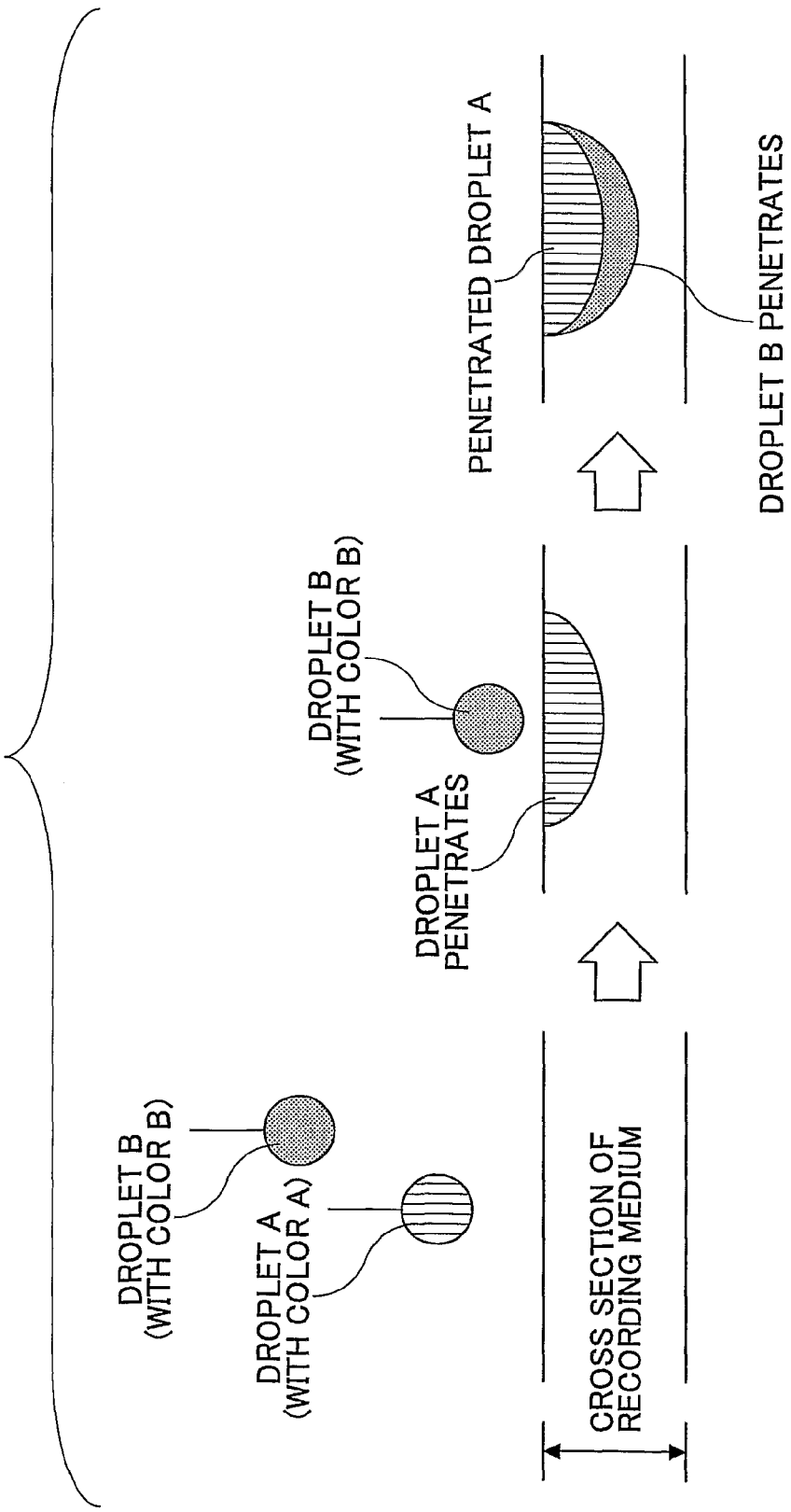
FIG. 27 is a drawing illustrating a penetration process of superposed pigmented inks with different colors.

FIG. 27 is a drawing illustrating a penetration process of pigmented inks. As shown in FIG. 27, the coloring material (pigment) of a first pigmented ink jetted first onto a recording medium remains in a position near the surface of the recording medium and the coloring material of a second pigmented ink jetted second onto the recording medium sinks deep into the recording medium. As a result, the color of the first pigmented ink becomes more prominent than that of the second pigmented ink.

In the above method where a defect caused by a failed nozzle is covered with extra-large dots (>input level 255), the amount of ink of each extra-large dot is even greater than that of a full-size dot. If extra-large dots are used for a mixed color of two or more colors, the color of first-jetted extra-large dots may become prominent and the mixed color may not be reproduced.

Figure 28:
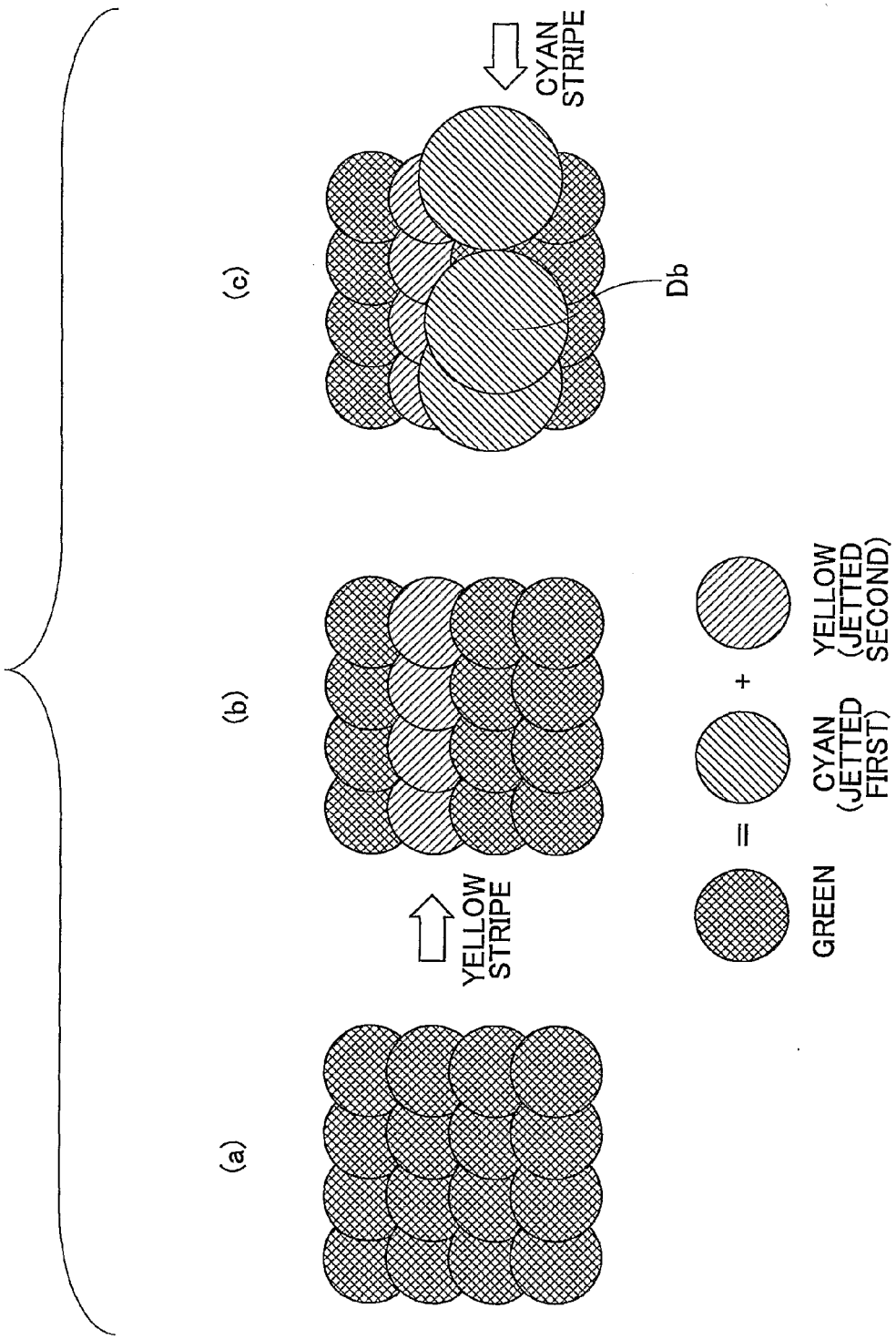
FIG. 28 is a drawing illustrating a problem in correcting a defect caused by an abnormal nozzle in a secondary color part of an image.

This problem is described in more detail with reference to FIG. 28. FIG. 28 shows an example where a color shift is caused by first-jetted dots. In FIG. 28, it is assumed that green, which is a secondary color, is formed with cyan and yellow inks (the cyan ink is jetted first).

If a nozzle for jetting cyan ink fails, jetting of cyan inks for pixels corresponding to the failed nozzle is turned off and quantization errors of the pixels are distributed to neighboring pixels. Consequently, extra-large cyan dots (>input level 255) are formed in the neighboring pixels prior to yellow dots. In this case, the color of the extra-large dots becomes prominent and the color of the yellow dots becomes unnoticeable. Also, the extra-large cyan dots protrude into adjacent pixels and affect the color of the adjacent pixels.

Thus, a correction process performed to cover a yellow stripe as shown in FIG. 28(b) may result in formation of a cyan stripe as shown in FIG. 28(c).

In an embodiment of the present invention, after a multilevel error diffusion process is performed as described above to correct or cover a defect caused by an abnormal nozzle, whether an extra-large dot larger than the full-size dot (input level 255) is generated is determined as shown in the flowchart of FIG. 18.

If an extra-large dot is generated, it is determined whether the color of the pixel in which the extra-large dot is to be formed is a secondary or higher color (i.e., whether the color is formed by multiple dots with different colors). If the color is a secondary or higher color, it is determined whether the extra-large dot is to be formed last among the multiple dots for forming the color. Then, based on the result of determination, whether it is necessary to remove or resize the extra-large dot is determined.

If the color is a secondary or higher color but the extra-large dot is not the last dot to be formed, i.e., if it is necessary to remove or resize the extra-large dot, the extra-large dot is either removed or its dot size is reduced according to the proportions of (output levels of) the colors constituting the secondary or higher color.

Figure 29:
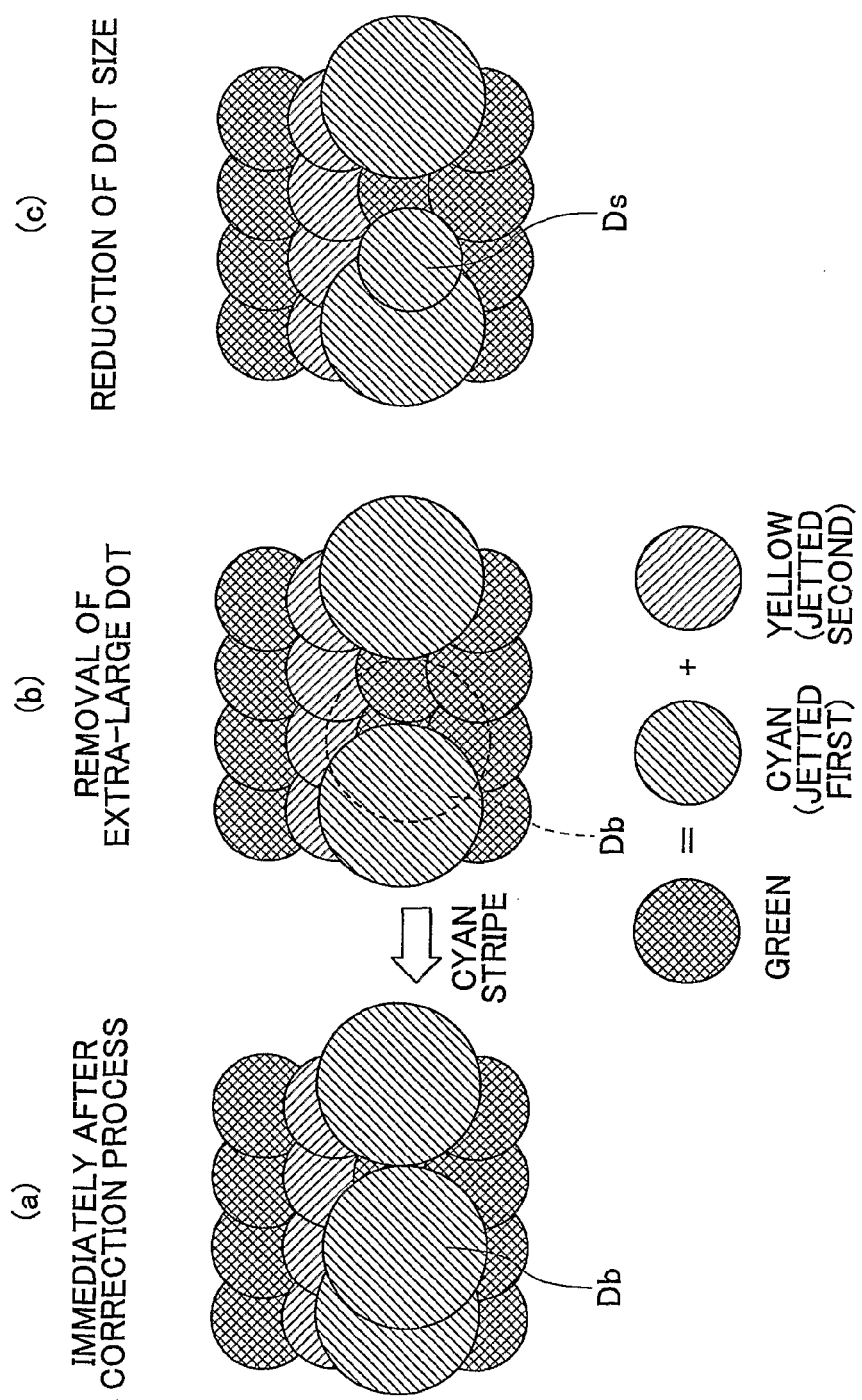
FIG. 29 is a drawing illustrating a color adjustment process according to an embodiment of the present invention.

For example, if extra-large cyan dots Db are generated in neighboring pixels as a result of a correction process as shown in FIG. 29(a), one or more of the extra-large cyan dots Db (or extra-large droplets to be jetted onto the corresponding pixel positions) are removed as shown in FIG. 29(b) (removed dot is indicated by a dotted line), or the dot size of one or more of the extra-large cyan dots Db (or the size of extra-large droplets to be jetted onto the corresponding pixel positions) is reduced (a dot with a reduced size is indicated by Ds) as shown in FIG. 29(c).

Performing the above process together with halftone processing using a multilevel error diffusion process makes it possible to cover or correct image defects caused by abnormal nozzles while preventing alteration of a secondary or higher color.

As described above, an embodiment of the present invention provides an image processing method including a conversion step of converting multilevel data of an image into a dot pattern using a multilevel error diffusion process supporting n gradation levels (n≧2). The conversion step includes the steps of determining a pixel corresponding to an abnormal nozzle incapable of correctly jetting droplets onto the recording medium or incapable of jetting droplets of a particular droplet size based on abnormal nozzle information provided for each of droplet sizes supported by the nozzles; preventing jetting of a droplet onto the determined pixel corresponding to the abnormal nozzle; distributing a quantization error of the determined pixel calculated in the multilevel error diffusion process to neighboring pixels; and if extra-large droplets with a droplet size greater than a droplet size of a full-size droplet capable of filling a pixel are to be formed in the neighboring pixels as a result of distributing the quantization error, removing one or more of the extra-large droplets or reducing the droplet size of one or more of the extra-large droplets.

With this method, a correction process for correcting or covering an image defect caused by an abnormal nozzle incapable of correctly recording an image (or correctly jetting droplets) is incorporated in halftone processing for converting multilevel data into a dot pattern. Thus, unlike a correction method employing multi-pass recording, this method does not greatly reduce the recording speed. Also, using a multilevel error diffusion process for halftone processing makes it possible to diffuse an irregularity in a dot pattern caused by the correction process to neighboring pixels and thereby makes it possible to correct or cover defects such as a white stripe in an image caused by an abnormal nozzle such that they are not easily recognizable by human eyes. Further, when extra-large droplets with a size greater than the size of a full-size droplet capable of filling a pixel are used, one or more of the droplets are removed or reduced in size according to predetermined criteria to prevent side effects (secondary problems) on an image.

The removal rate and the size reduction ratio of extra-large droplets are not fixed and determined based on the degree of influence of first-jetted extra-large dots which varies depending on the composition of ink and a recording medium (e.g., paper) and the amount of ink used for each dot size. For example, appropriate values may be selected from preset removal rates and size reduction ratios depending on the type of recording medium, color, resolution, and/or a recording mode.

In the above embodiment, a method of solving or reducing problems caused by extra-large dots when forming a secondary or higher color is described. However, extra-large dots may also cause problems such as bleeding and transfer of undried ink even when forming a single color. Such problems may be solved or reduced by removing or downsizing one or more of the extra-large dots based on absorption characteristics of the recording medium (total amount control). This in turn makes it possible to improve the effectiveness of a correction process for correcting or covering an image defect caused by an abnormal nozzle.

Also, the removal rate or the size reduction ratio may be varied depending on a part of an image or an (type of) object to which a correction process is to be applied. For example, although a color stripe in a fill pattern is highly conspicuous but a color stripe in an edge portion is comparatively inconspicuous. Therefore, the removal rate or the size reduction ratio of extra-large droplets in a fill pattern is preferably made higher than that in an edge portion.

Also, since the quality of line images and characters is greatly affected by bleeding, the removal rate or the size reduction ratio of extra-large droplets in a line image or a character is preferably made higher than that in other types of objects.

In the above embodiment, it is assumed that the correction process is performed by a program such as a printer driver during halftone processing. Alternatively, the correction process of the above embodiment may be performed by an ASIC having the same functions as those of the printer driver. For example, an ASIC is preferably used for the correction process in a printer having a direct print function that enables printing an image without using a host computer and in a facsimile machine or a copier including inkjet recording heads. A program (such as a printer driver) performing the correction process of the above embodiment may be stored in a storage medium (e.g., CD-ROM, DVD-ROM, or memory card) and distributed or installed via such a storage medium or a network.

An aspect of the present invention makes it possible to prevent or reduce occurrence of secondary problems (side effects) resulting from a correction process for correcting or covering an image defect caused by an abnormal nozzle and thereby makes it possible to improve image quality.

The present invention is not limited to the specifically disclosed embodiments, and variations and modifications may be made without departing from the scope of the present invention.

The present application is based on Japanese Priority Application No. 2008-179616, filed on Jul. 9, 2008, the entire contents of which are hereby incorporated herein by reference.

The invention claimed is:

1. A method of processing image data for an image forming apparatus for forming an image on a recording medium using a recording head including multiple nozzles for jetting ink droplets, the method comprising:
 a conversion step of converting multilevel data of the image into a dot pattern using a multilevel error diffusion process supporting n gradation levels (n≧2), wherein the conversion step includes the steps of:

determining a pixel corresponding to an abnormal nozzle incapable of correctly jetting droplets onto the recording medium or incapable of jetting droplets of a particular droplet size based on abnormal nozzle information provided for each of droplet sizes supported by the nozzles;

preventing jetting of a droplet onto the determined pixel corresponding to the abnormal nozzle;

distributing a quantization error of the determined pixel calculated in the multilevel error diffusion process to neighboring pixels; and if extra-large droplets with a droplet size greater than a droplet size of a full-size droplet capable of filling a pixel are to be formed in the neighboring pixels as a result of distributing the quantization error, removing one or more of the extra-large droplets or reducing the droplet size of one or more of the extra-large droplets.

2. The method as claimed in claim 1, wherein if two or more droplets of different colors are to be used for each of the neighboring pixels and if the extra-large droplets are to be jetted onto the neighboring pixels before other droplets are jetted onto the neighboring pixels, the one or more of the extra-large droplets are removed or the droplet size of the one or more of the extra-large droplets is reduced according to proportions of output levels of the different colors.

3. The method as claimed in claim 1, wherein if only one droplet of a color is to be used for each of the neighboring pixels, the one or more of the extra-large droplets are removed or the droplet size of the one or more of the extra-large droplets is reduced according to ink absorption characteristics of the recording medium.

4. The method as claimed in claim 1, wherein a removal rate or a size reduction ratio of the extra-large droplets is varied depending on a type of object in the image to which the neighboring pixels belong.

5. The method as claimed in claim 1, wherein a removal rate or a size reduction ratio of the extra-large droplets is varied depending on whether the neighboring pixels are in an edge portion or non-edge portion of the image.

6. A storage medium having program code embodied therein for causing a computer to perform a method of processing image data for an image forming apparatus for forming an image on a recording medium using a recording head including multiple nozzles for jetting ink droplets, the method comprising:

a conversion step of converting multilevel data of the image into a dot pattern using a multilevel error diffusion process supporting n gradation levels ($n \geq 2$), wherein the conversion step includes the steps of:

determining a pixel corresponding to an abnormal nozzle incapable of correctly jetting droplets onto the recording medium or incapable of jetting droplets of a particular droplet size based on abnormal nozzle information provided for each of droplet sizes supported by the nozzles;

preventing jetting of a droplet onto the determined pixel corresponding to the abnormal nozzle;

distributing a quantization error of the determined pixel calculated in the multilevel error diffusion process to neighboring pixels; and if extra-large droplets with a droplet size greater than a droplet size of a full-size droplet capable of filling a pixel are to be formed in the neighboring pixels as a result of distributing the quantization error, removing one or more of the extra-large droplets or reducing the droplet size of one or more of the extra-large droplets.

7. An image forming apparatus for forming an image on a recording medium using a recording head including multiple nozzles for jetting ink droplets, comprising:

a control unit configured to convert multilevel data of the image into a dot pattern using a multilevel error diffusion process supporting n gradation levels ($n \geq 2$), wherein the control unit is configured to determine a pixel corresponding to an abnormal nozzle incapable of correctly jetting droplets onto the recording medium or incapable of jetting droplets of a particular droplet size based on abnormal nozzle information provided for each of droplet sizes supported by the nozzles;

to prevent jetting of a droplet onto the determined pixel corresponding to the abnormal nozzle;

to distribute a quantization error of the determined pixel calculated in the multilevel error diffusion process to neighboring pixels; and if extra-large droplets with a droplet size greater than a droplet size of a full-size droplet capable of filling a pixel are to be formed in the neighboring pixels as a result of distributing the quantization error, to remove one or more of the extra-large droplets or reduce the droplet size of one or more of the extra-large droplets.

* * * * *